US008544792B2

(12) United States Patent
Perry et al.

(10) Patent No.: US 8,544,792 B2
(45) Date of Patent: Oct. 1, 2013

(54) TOWBARLESS AIRPLANE TUG

(75) Inventors: Arie Perry, Hod Hasharon (IL); Ran Braier, Shoham (IL)

(73) Assignee: Israel Aerospace Industries Ltd., Lod (IL)

( * ) Notice: Subject to any disclaimer, the term of this patent is extended or adjusted under 35 U.S.C. 154(b) by 458 days.

(21) Appl. No.: 12/619,123

(22) Filed: Nov. 16, 2009

(65) Prior Publication Data
US 2010/0140392 A1 Jun. 10, 2010

Related U.S. Application Data

(63) Continuation of application No. PCT/IL2008/000459, filed on Apr. 2, 2008, and a continuation-in-part of application No. 11/798,777, filed on May 16, 2007, now Pat. No. 8,245,980, which is a continuation-in-part of application No. 11/528,647, filed on Sep. 28, 2006, now Pat. No. 7,975,959.

(30) Foreign Application Priority Data

Jan. 8, 2008 (WO) .................. PCT/IL2008/000036

(51) Int. Cl.
*B64C 13/20* (2006.01)
(52) U.S. Cl.
USPC .............................................. 244/50; 180/6.2
(58) Field of Classification Search
USPC .................. 244/17.17, 50, 116, 189; 180/6.2, 180/14.1, 14.7, 65.2, 904; 414/426–429
See application file for complete search history.

(56) References Cited

U.S. PATENT DOCUMENTS 2,539,010 A    1/1951 Cox
2,751,990 A *  6/1956 Pearson et al. .................. 180/6.2
(Continued)

FOREIGN PATENT DOCUMENTS

CN    2458238 Y    11/2001
CN    1511759 A    7/2004
(Continued)

OTHER PUBLICATIONS

International Search Report issued in International Application No. PCT/IL2008/00459 on Nov. 6, 2008.
(Continued)

*Primary Examiner* — Rob Swiatek
*Assistant Examiner* — Valentina Xavier
(74) *Attorney, Agent, or Firm* — Oliff & Berridge, PLC

(57) ABSTRACT

Disclosed a towbarless airplane tug and method of operating thereof. The tug comprises a chassis mounted on a plurality of tug wheels, at least some of said tug wheels being steerable tug wheels and at least some of said tug wheels being drivable tug wheels; an airplane wheel support turret assembly, rotatably mounted in connection with said chassis and operative to support at least one wheel of a nose landing gear of an airplane; at least one rotation sensor connected to said wheel support turret assembly and operative to sense rotation of said wheel support turret assembly relative to said chassis, said rotation resulting at least from steering control induced movement of the nose landing gear caused by pilot-controlled ground steering of said airplane, and to generate an output indicating a direction of said pilot-controlled ground steering of said airplane; at least one tug wheel driver unit operative to drive said drivable tug wheels; at least one tug wheel steering mechanism operative to steer said steerable tug wheels thereby providing steering of said chassis; and at least one tug controller operative to control operation of at least said tug wheel steering mechanism at least in response to said output of said rotation sensor, so as to cause steering said steerable tug wheels such that said chassis moves in the direction indicated in said output of said rotation sensor.

27 Claims, 31 Drawing Sheets

(56) References Cited

U.S. PATENT DOCUMENTS

| | | | |
|---|---|---|---|
| 2,957,650 A | | 10/1960 | Horan et al. |
| 2,966,222 A | | 12/1960 | Lambert, Jr. |
| 3,064,746 A | | 11/1962 | Williamson |
| 3,279,722 A | | 10/1966 | Glover, Jr. et al. |
| 4,007,890 A | | 2/1977 | Bremer et al. |
| 4,036,384 A | | 7/1977 | Johnson |
| 4,113,041 A | * | 9/1978 | Birkeholm ............... 180/14.1 |
| 4,122,960 A | | 10/1978 | Bauer et al. |
| 4,225,279 A | * | 9/1980 | Boyer ....................... 414/428 |
| 4,237,994 A | | 12/1980 | McColl |
| 4,375,244 A | | 3/1983 | Morin |
| 4,482,961 A | | 11/1984 | Kilner et al. |
| 4,632,625 A | | 12/1986 | Schuller et al. |
| 4,658,924 A | | 4/1987 | Dobbie |
| 4,730,685 A | | 3/1988 | Sinkkonen |
| 4,745,410 A | | 5/1988 | Schuller et al. |
| 4,810,157 A | | 3/1989 | Schopf |
| 4,836,734 A | | 6/1989 | Pollner et al. |
| 4,842,220 A | | 6/1989 | Versteeg |
| 4,911,603 A | | 3/1990 | Pollner et al. |
| 4,911,604 A | | 3/1990 | Pollner et al. |
| 4,913,253 A | | 4/1990 | Bowling |
| 4,917,563 A | | 4/1990 | Pollner et al. |
| 4,917,564 A | | 4/1990 | Pollner et al. |
| 4,923,253 A | | 5/1990 | Pollner et al. |
| 4,950,121 A | * | 8/1990 | Meyer et al. ............... 414/428 |
| 4,976,499 A | | 12/1990 | Guichard et al. |
| 4,994,681 A | | 2/1991 | Mann |
| 4,997,331 A | * | 3/1991 | Grinsted et al. ........... 414/429 |
| 5,013,205 A | | 5/1991 | Schardt |
| 5,048,625 A | | 9/1991 | Birkeholm |
| 5,051,052 A | | 9/1991 | Franken et al. |
| 5,054,714 A | | 10/1991 | Franken et al. |
| 5,078,340 A | | 1/1992 | Anderberg |
| 5,082,082 A | | 1/1992 | Hvolka |
| 5,110,067 A | | 5/1992 | Sinkkonen |
| 5,151,003 A | | 9/1992 | Zschoche |
| 5,176,341 A | | 1/1993 | Ishikawa et al. |
| 5,202,075 A | | 4/1993 | Barnard et al. |
| 5,219,033 A | | 6/1993 | Pollner et al. |
| 5,259,572 A | | 11/1993 | Franken et al. |
| 5,261,778 A | | 11/1993 | Zschoche |
| 5,302,074 A | | 4/1994 | Elfstrom |
| 5,302,075 A | | 4/1994 | Zschoche |
| 5,302,076 A | | 4/1994 | Bammel et al. |
| 5,308,212 A | | 5/1994 | Pollner et al. |
| 5,314,287 A | | 5/1994 | Wichert |
| 5,346,354 A | | 9/1994 | Hellstrom |
| 5,381,987 A | | 1/1995 | Carns |
| 5,480,274 A | | 1/1996 | Franken et al. |
| 5,511,926 A | | 4/1996 | Iles |
| 5,516,252 A | | 5/1996 | Francke et al. |
| 5,549,436 A | * | 8/1996 | Fresia ....................... 414/426 |
| 5,562,388 A | | 10/1996 | Le Gall et al. |
| 5,655,733 A | | 8/1997 | Roach |
| 5,680,125 A | | 10/1997 | Elfstrom et al. |
| 5,860,785 A | * | 1/1999 | Eberspacher ............. 414/428 |
| 6,209,671 B1 | | 4/2001 | Klein et al. |
| 6,283,696 B1 | | 9/2001 | Trummer et al. |
| 6,301,529 B1 | | 10/2001 | Itoyama et al. |
| 6,305,484 B1 | * | 10/2001 | Leblanc ................... 180/167 |
| 6,352,130 B2 | | 3/2002 | Klein et al. |
| 6,352,318 B1 | | 3/2002 | Hosomi et al. |
| 6,357,989 B1 | | 3/2002 | Iles |
| 6,390,762 B1 | | 5/2002 | Peery et al. |
| 6,405,975 B1 | | 6/2002 | Sankrithi et al. |
| 6,543,790 B2 | | 4/2003 | Johnson |
| 6,600,992 B2 | | 7/2003 | Dow |
| 6,675,920 B1 | | 1/2004 | Diez et al. |
| 6,739,822 B2 | * | 5/2004 | Johansson ............... 414/427 |
| 6,751,588 B1 | | 6/2004 | Menendez-Pidal et al. |
| 6,923,281 B2 | * | 8/2005 | Chernoff et al. ......... 180/65.245 |
| 6,945,354 B2 | * | 9/2005 | Goff ......................... 414/429 |
| 8,181,725 B2 | * | 5/2012 | Andres et al. ............. 180/14.7 |
| 2002/0173904 A1 | | 11/2002 | Dow |
| 2003/0047362 A1 | | 3/2003 | Chernoff et al. |
| 2003/0095854 A1 | | 5/2003 | Abela |
| 2005/0196256 A1 | | 9/2005 | Rodenkirch et al. |
| 2006/0056949 A1 | | 3/2006 | Eckert |
| 2006/0278756 A1 | | 12/2006 | Marshall |
| 2008/0083851 A1 | * | 4/2008 | Perry et al. ............... 244/189 |
| 2009/0183499 A1 | | 7/2009 | Boorse |
| 2011/0127366 A1 | | 6/2011 | Becker |

FOREIGN PATENT DOCUMENTS

| | | |
|---|---|---|
| DE | 33 27 628 A1 | 2/1985 |
| DE | 33 27 629 A1 | 2/1985 |
| DE | 35 21 429 A1 | 12/1986 |
| DE | 35 34 045 A1 | 4/1987 |
| DE | 38 44 744 C2 | 9/1988 |
| DE | 39 28 854 A1 | 3/1991 |
| DE | 40 07 610 A1 | 9/1991 |
| DE | 40 09 419 A1 | 9/1991 |
| DE | 41 02 861 A1 | 8/1992 |
| DE | 41 31 649 A1 | 3/1993 |
| DE | 43 24 211 A1 | 1/1995 |
| DE | 43 40 919 A1 | 3/1995 |
| DE | 44 46 047 A1 | 7/1996 |
| DE | 44 46 048 A1 | 7/1996 |
| DE | 197 34 238 A1 | 2/1998 |
| EP | 0 235 845 A1 | 9/1987 |
| EP | 0 649 787 A1 | 4/1995 |
| EP | 1 190 947 A1 | 3/2002 |
| EP | 1 623 924 A1 | 2/2006 |
| EP | 1 634 808 A1 | 3/2006 |
| FR | 2 581 965 A1 | 11/1986 |
| FR | 2 675 919 A1 | 10/1992 |
| FR | 2 911 658 A1 | 7/2008 |
| GB | 1 249 465 | 10/1971 |
| JP | A-56-2237 | 1/1981 |
| JP | A-57-70741 | 5/1982 |
| JP | A-2-279497 | 11/1990 |
| JP | A-4-138997 | 5/1992 |
| JP | A-2001-505512 | 4/2001 |
| JP | A-2003-189412 | 7/2003 |
| RU | 2 302 980 C2 | 8/2003 |
| RU | 2 271 316 C2 | 6/2004 |
| WO | WO 85/00790 A1 | 2/1985 |
| WO | WO 89/03343 A1 | 4/1989 |
| WO | WO 90/11932 A1 | 10/1990 |
| WO | WO 93/13985 A1 | 7/1993 |
| WO | WO 98/25822 A1 | 6/1998 |
| WO | WO 98/52822 | 11/1998 |
| WO | WO 2004/028903 A1 | 4/2004 |
| WO | WO 2004/114252 | 12/2004 |
| WO | WO 2008/038270 A2 | 4/2008 |
| WO | WO 2010/012261 A2 | 2/2010 |

OTHER PUBLICATIONS

Written Opinion of the International Searching Authority issued in International Application No. PCT/IL2008/00459 on Nov. 6, 2008.
International Search Report issued in International Application No. PCT/IL2008/000036 on Oct. 14, 2008.
Written Opinion of the International Searching Authority issued in International Application No. PCT/IL2008/000036 on Oct. 14, 2008.

* cited by examiner

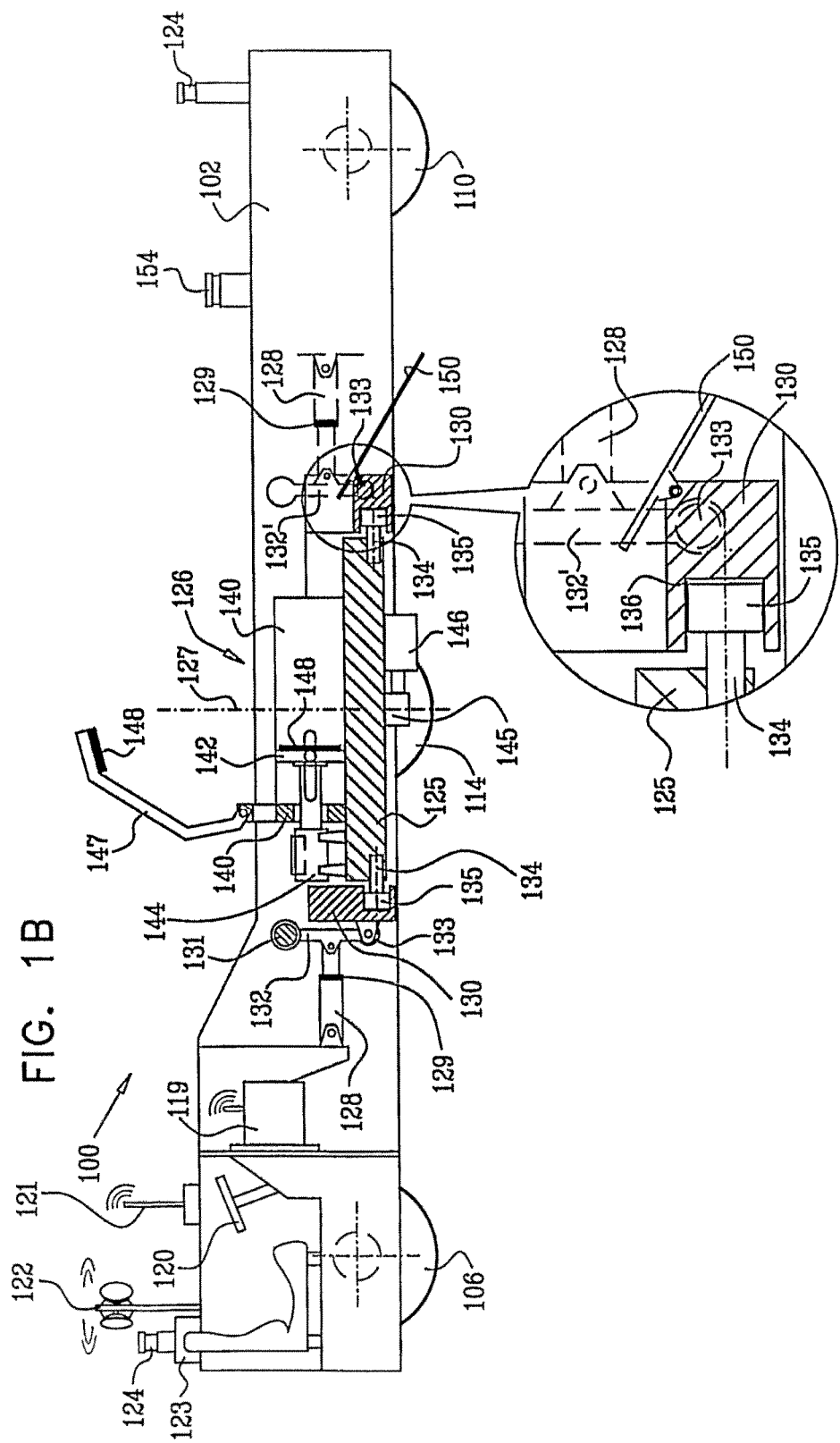

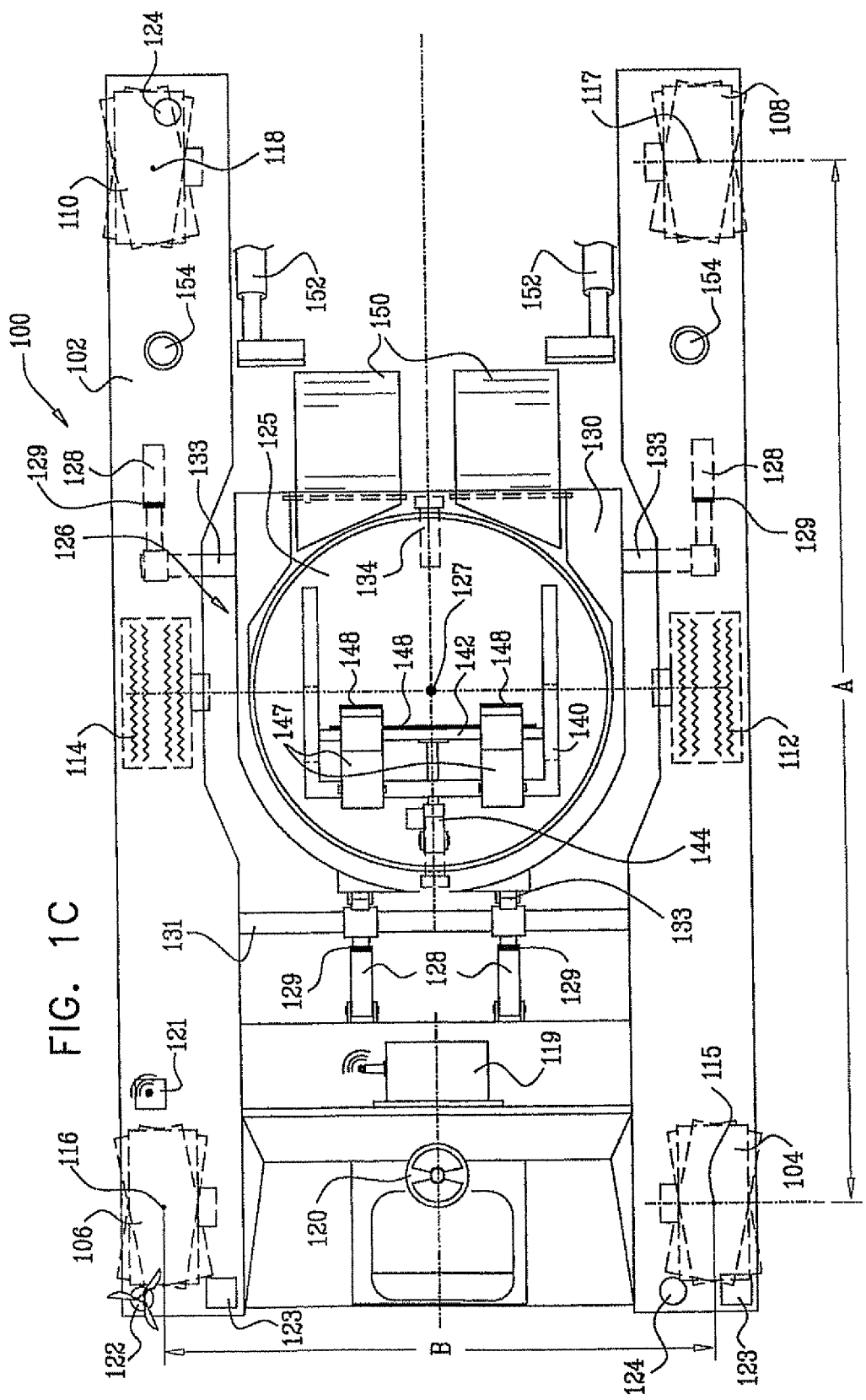

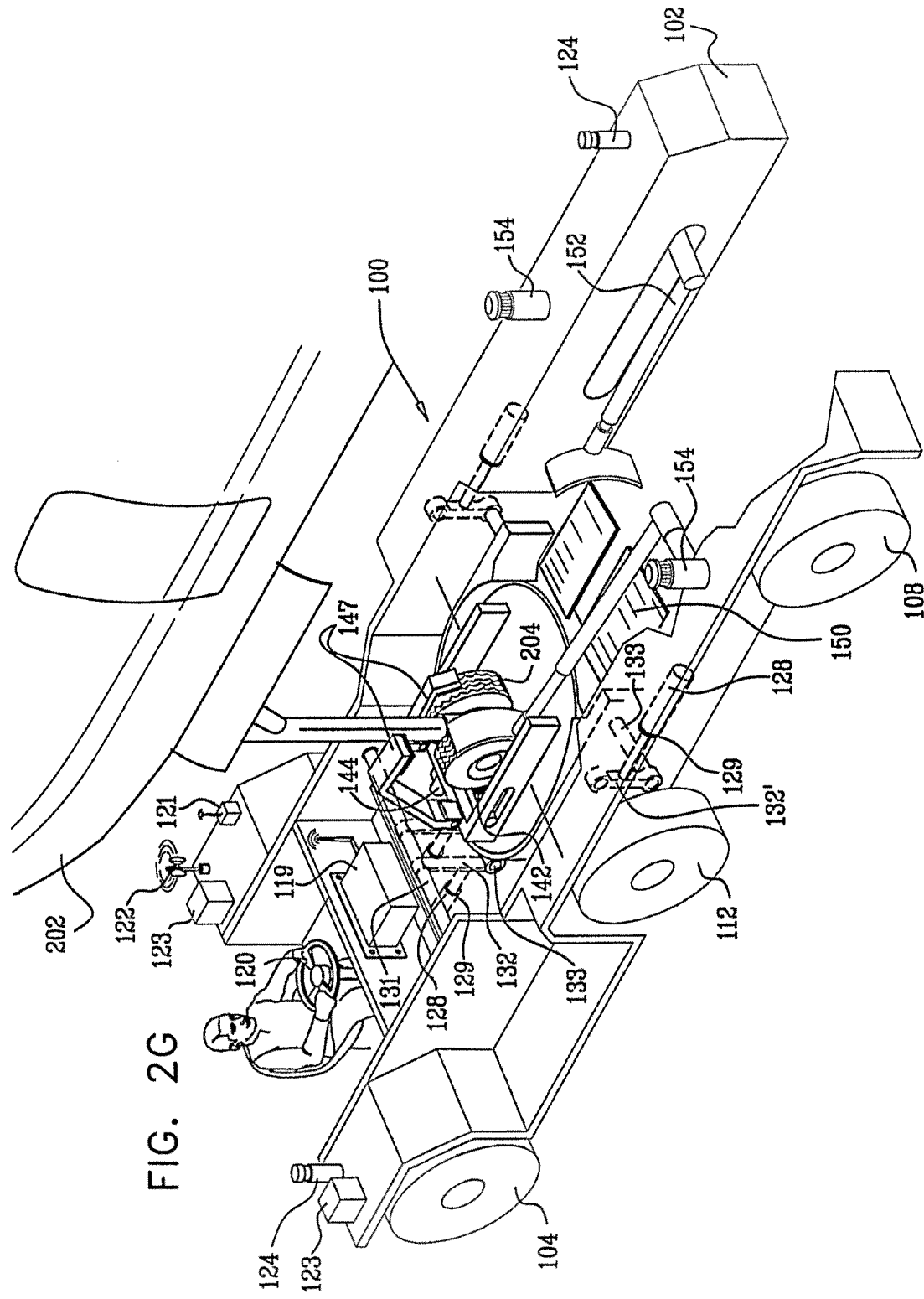

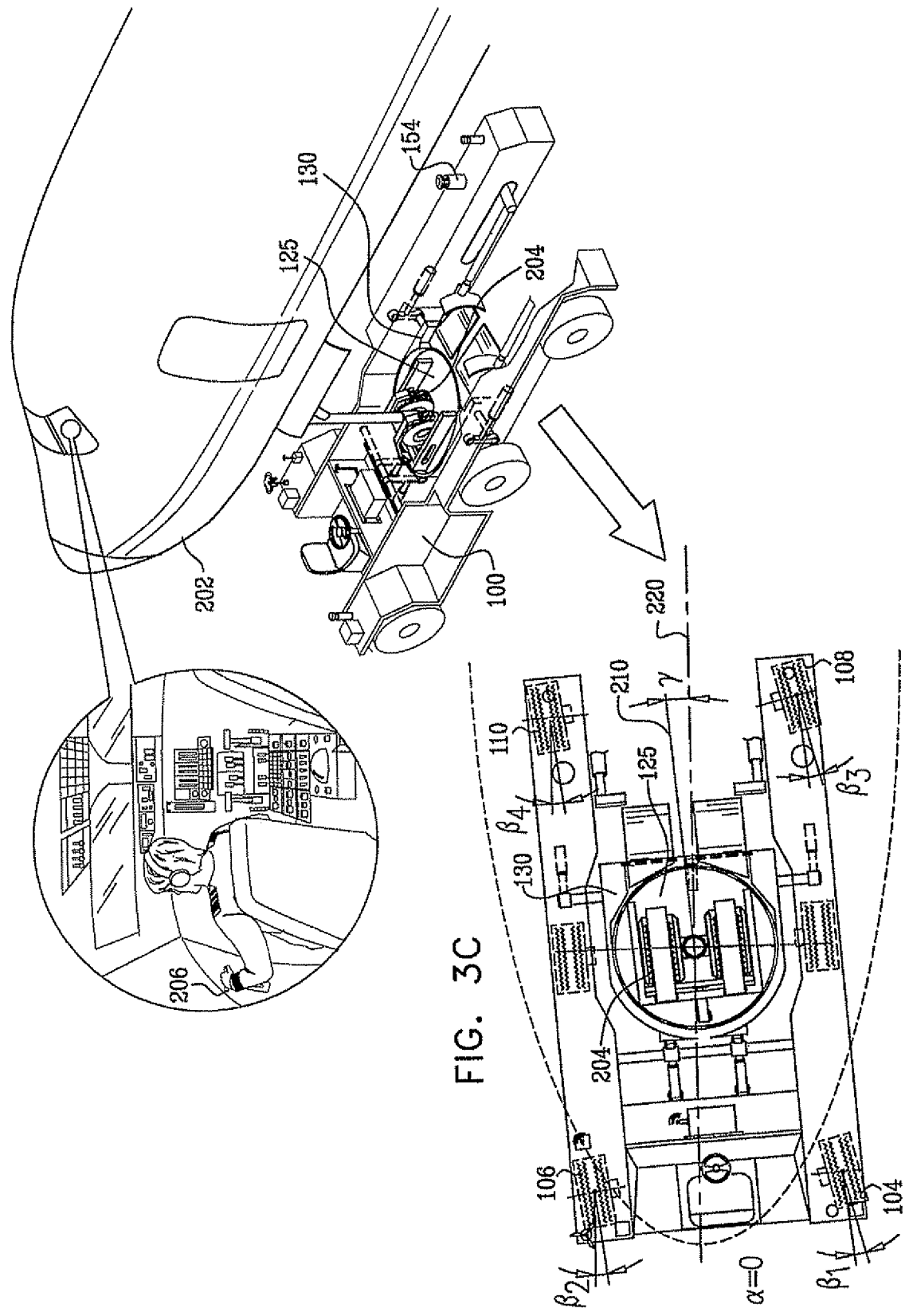

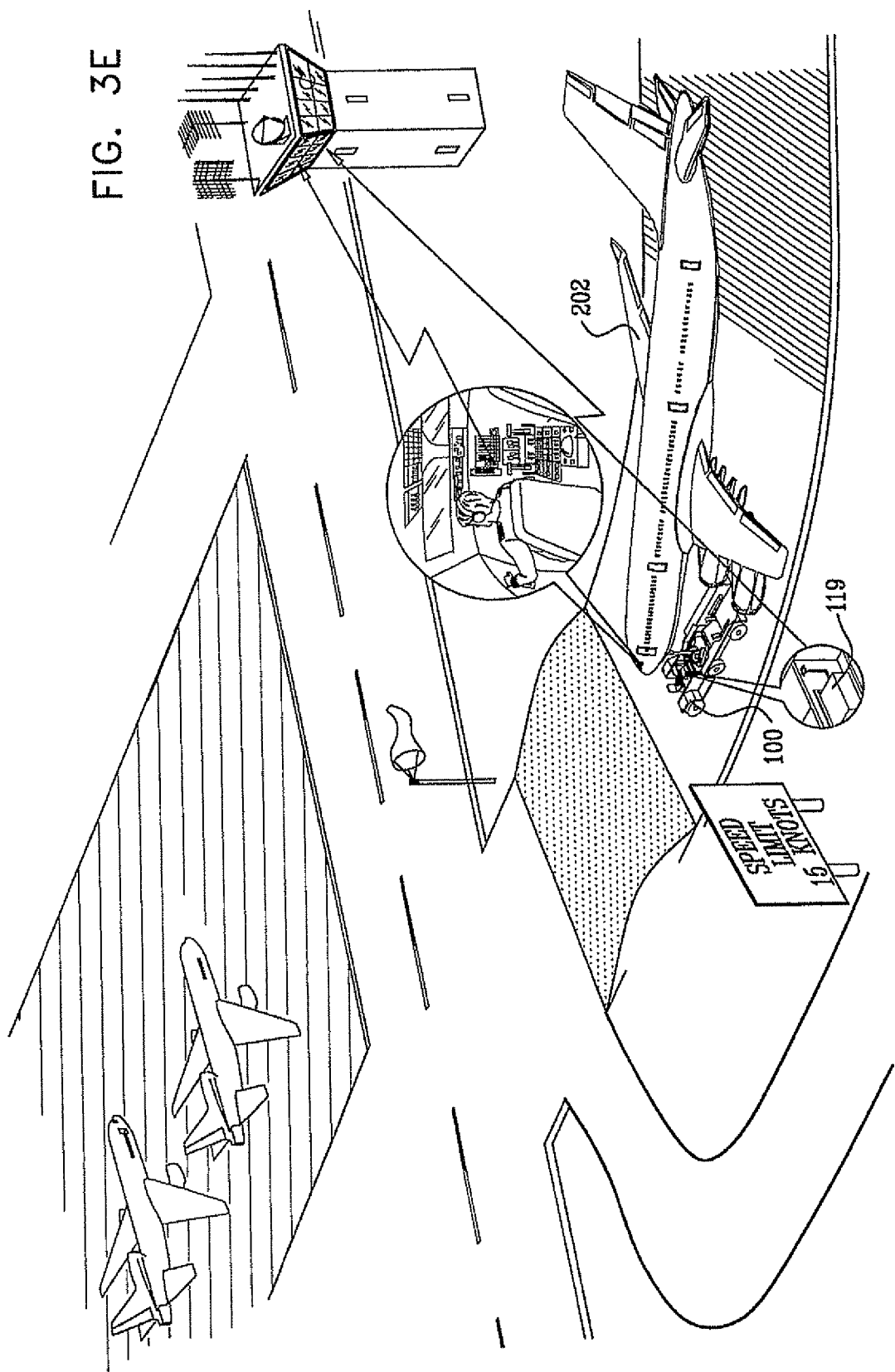

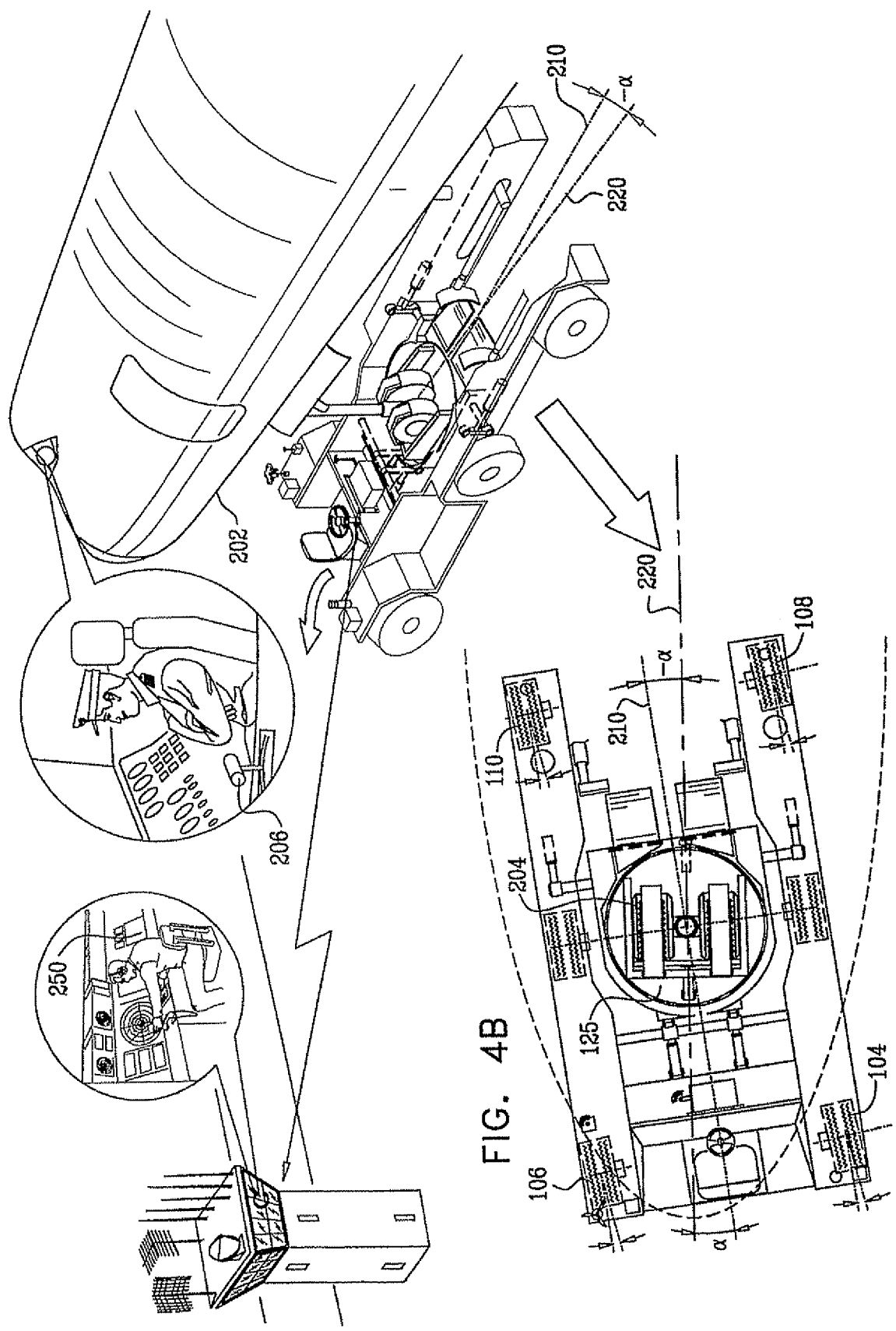

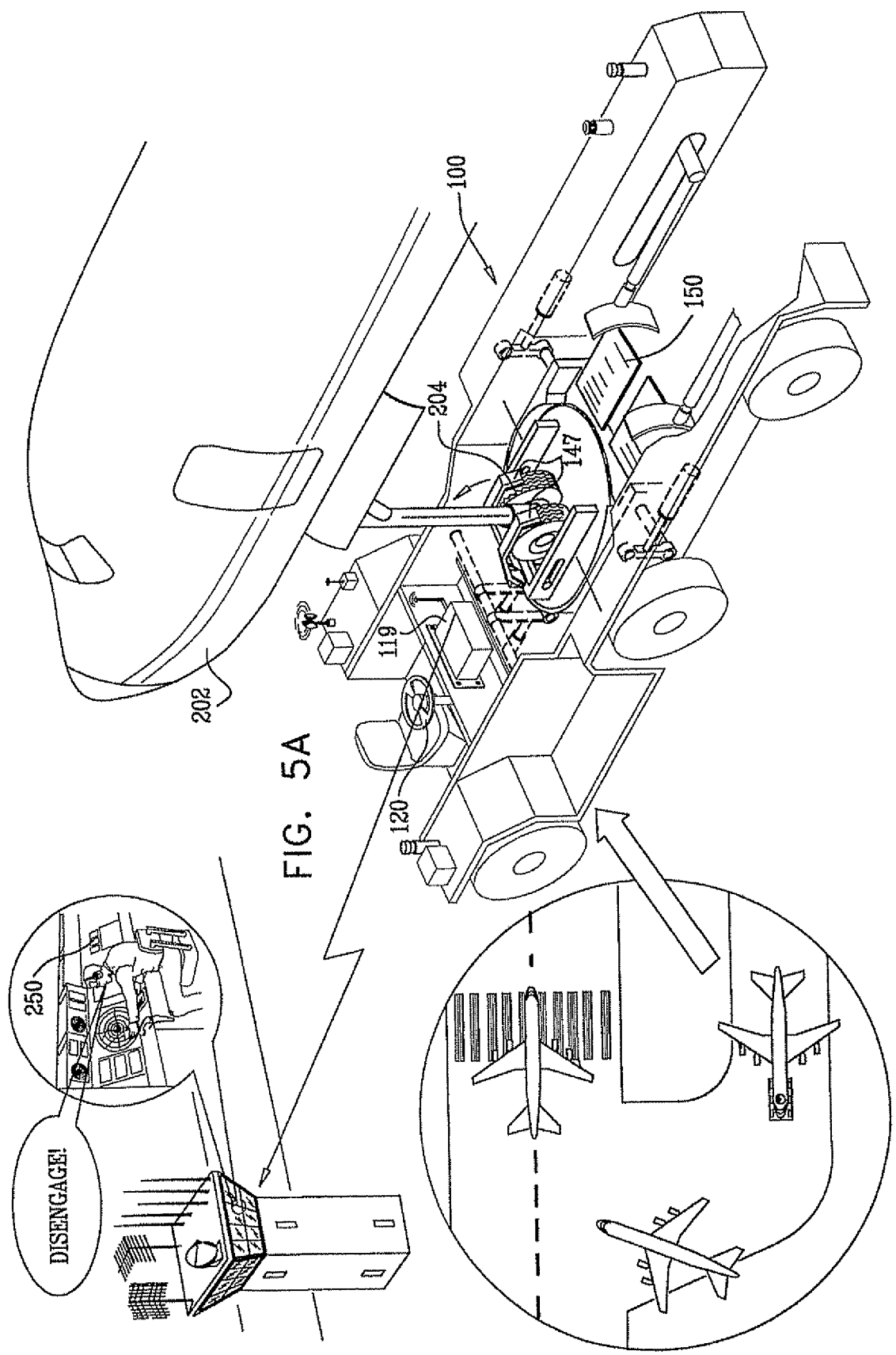

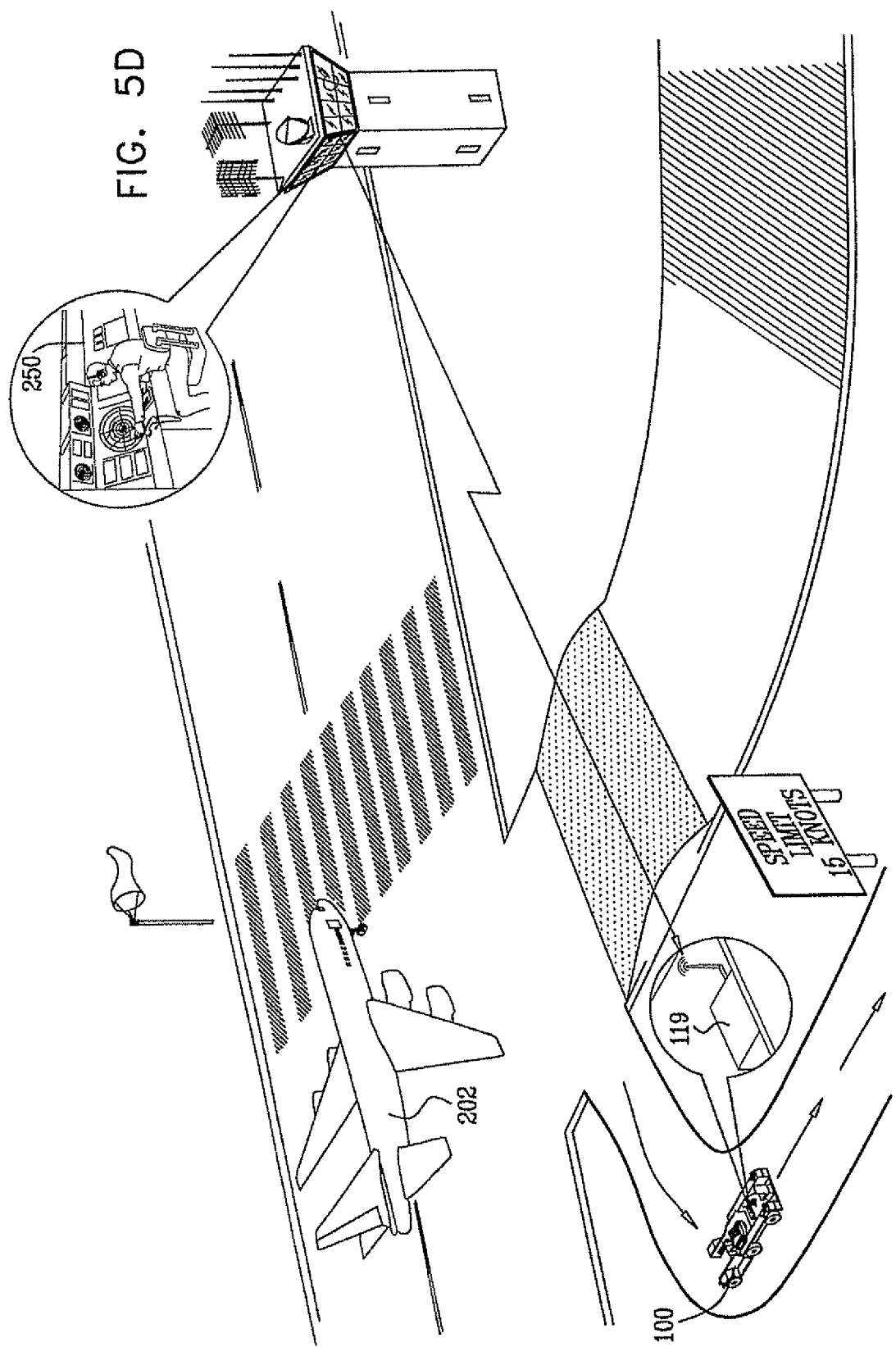

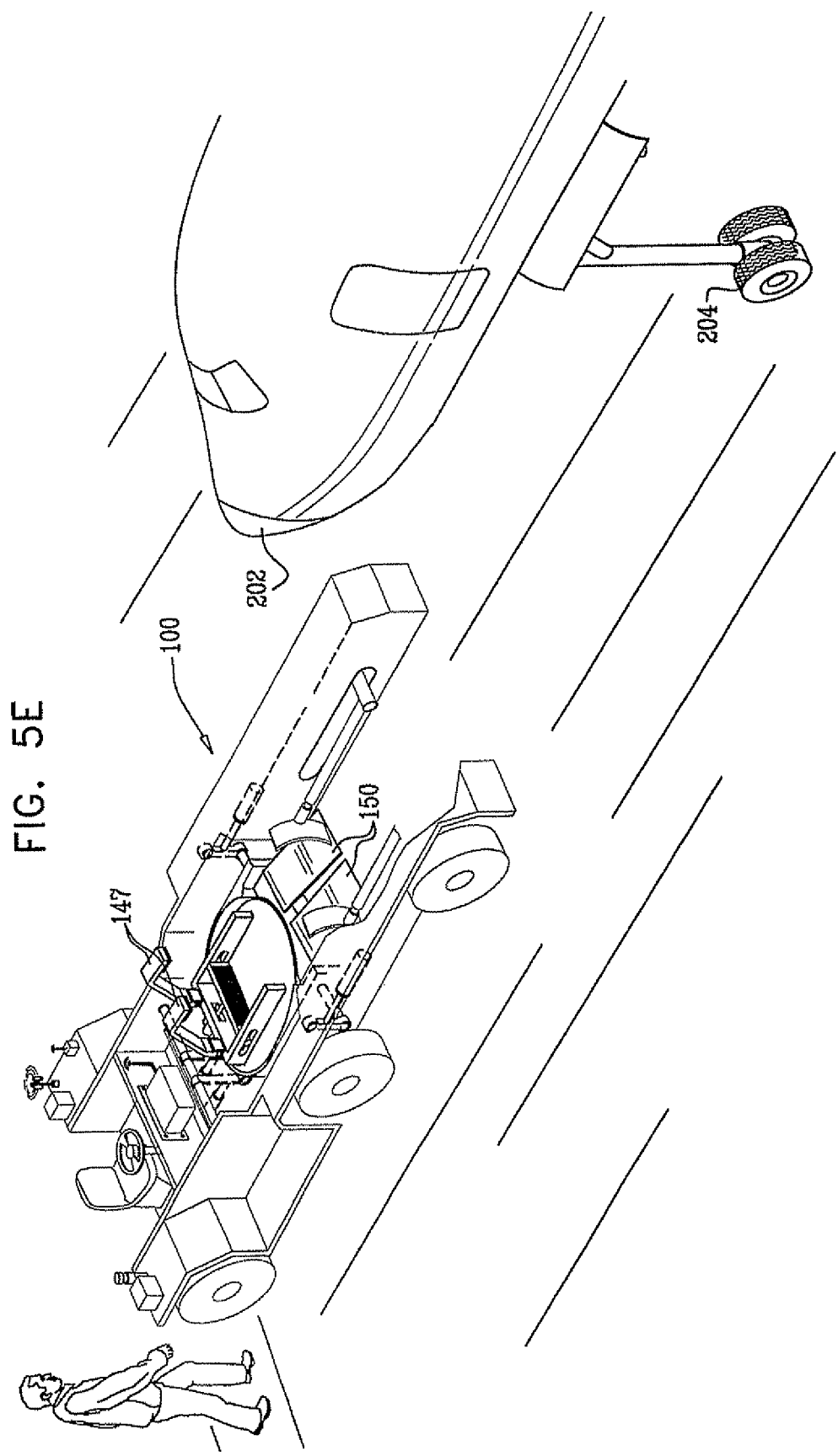

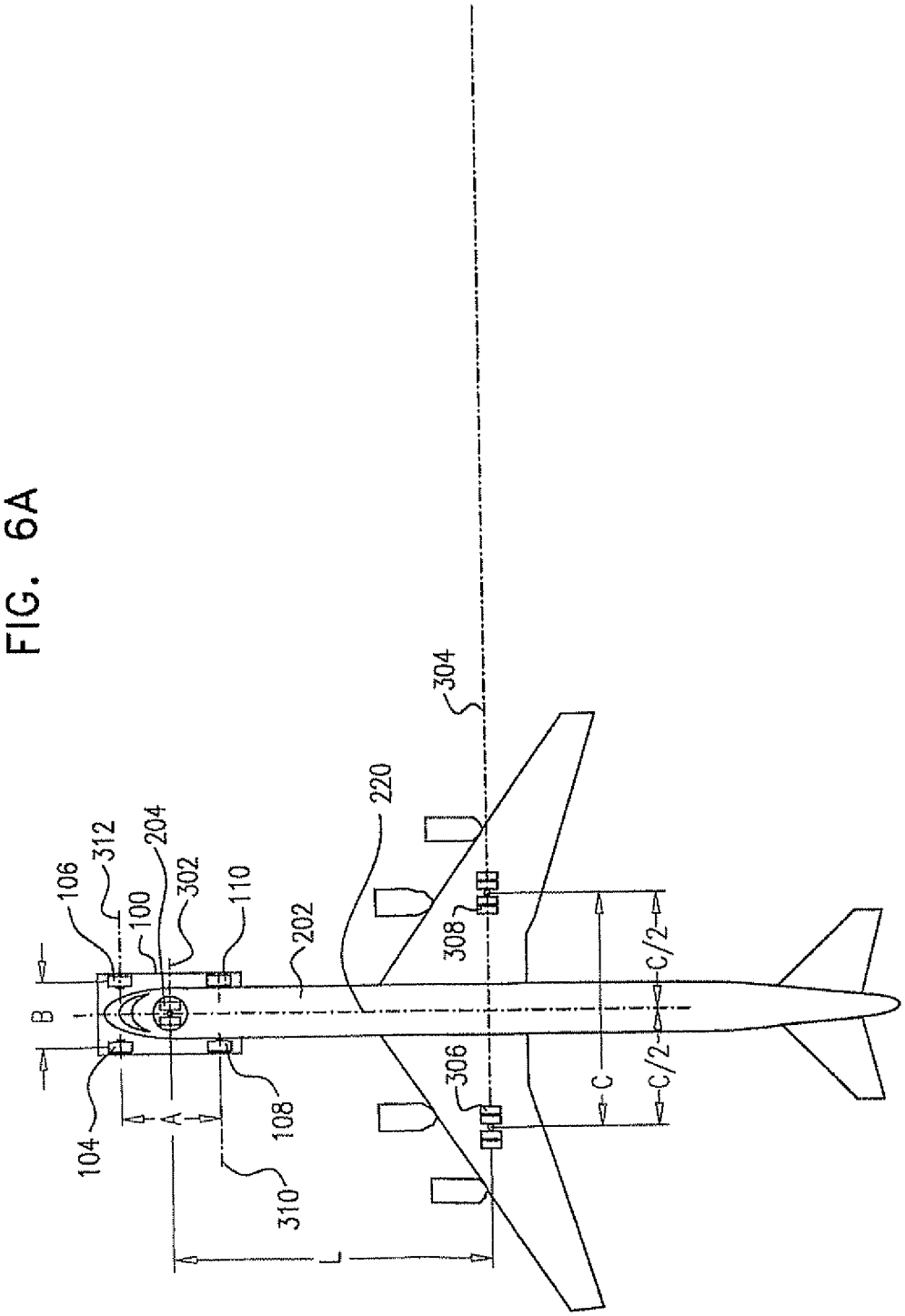

TOWBARLESS AIRPLANE TUG

This is a Continuation of Application No. PCT/IL2008/000459 filed Apr. 2, 2008, which claims the benefit of U.S. patent application Ser. No. 11/798,777 filed May 16, 2007 and International Patent Application No. PCT/IL2008/000036, filed Jan. 8, 2008. The disclosure of the prior applications is hereby incorporated by reference herein in its entirety.

This is also a Continuation-in-Part of application Ser. No. 11/798,777 filed May 16, 2007, which in turn is a Continuation-in-Part of application Ser. No. 11/528,647, filed Sep. 28, 2006. The disclosure of the prior applications is hereby incorporated by reference herein in its entirety.

REFERENCE TO RELATED APPLICATIONS

The following unpublished patent applications are related to the present application and the disclosures thereof are hereby incorporated by reference:

U.S. patent application Ser. No. 11/528,647, filed Sep. 28, 2006, entitled SYSTEM AND METHOD FOR TRANSFERRING AIRPLANES; U.S. patent application Ser. No. 11/798,777, filed May 16, 2007, entitled SYSTEM AND METHOD FOR TRANSFERRING AIRPLANES; and PCT Patent Application No. IL2008/000036, filed Jan. 8, 2008, entitled SYSTEM AND METHOD FOR TRANSFERRING AIRPLANES.

Priority is hereby claimed under 37 CFR 1.78(a)(4) and (5)i from: U.S. patent application Ser. No. 11/798,777, filed May 16, 2007, entitled SYSTEM AND METHOD FOR TRANSFERRING AIRPLANES; and PCT Patent Application No. IL2008/000036, filed Jan. 8, 2008, entitled SYSTEM AND METHOD FOR TRANSFERRING AIRPLANES.

FIELD OF THE INVENTION

The present invention relates generally to systems for airplane ground movement and more particularly to ground vehicles operative to move airplane in an airport.

BACKGROUND OF THE INVENTION

The following patent publications are believed to represent the current state of the art:

U.S. Pat. Nos. 6,945,354; 6,739,822; 6,675,920; 6,751,588; 6,600,992; 6,405,975; 6,390,762; 6,357,989; 6,352,130; 6,305,484; 6,283,696; 6,209,671; 5,860,785; 5,680,125; 5,655,733; 5,562,388; 5,549,436; 5,516,252; 5,511,926; 5,480,274; 5,381,987; 5,346,354; 5,314,287; 5,308,212; 5,302,076; 5,302,075; 5,302,074; 5,261,778; 5,259,572; 5,219,033; 5,202,075; 5,176,341; 5,151,003; 5,110,067; 5,082,082; 5,078,340; 5,054,714; 5,051,052; 5,048,625; 5,013,205; 4,997,331; 4,976,499; 4,950,121; 4,923,253; 4,917,564; 4,917,563; 4,913,253; 4,911,604; 4,911,603; 4,836,734; 4,810,157; 4,745,410; 4,730,685; 4,658,924; 4,632,625; 4,482,961; 4,375,244; 4,225,279; 4,113,041 and 4,007,890;

U.S. Patent Publication Number 2003/095854;

PCT Patent Publication Numbers WO 93/13985; WO 89/03343 and WO 98/52822; and

Patent publication numbers RU 2302980; RU 2271316; EP 1623924; EP 1190947; JP 2279497; JP 4138997; JP 57070741; JP 56002237; GB 1249465; DE 3844744; DE 4446048; DE 4446047; DE 4131649; DE 4102861; DE 4009419; DE 4007610; DE 19734238; DE 3534045; DE 3521429; DE 3327629; DE 3327628; DE 4340919; FR 2581965 and FR 2675919.

SUMMARY OF THE INVENTION

The present invention seeks to provide novel robotic tugs for taxiing airplanes.

There is thus provided in accordance with a preferred embodiment of the present invention a towbarless airplane tug including a chassis mounted on a plurality of tug wheels, at least some of the plurality of tug wheels being steerable tug wheels, a base assembly, mounted on the tug chassis, an airplane nose wheel support turret assembly, rotatably mounted on the base assembly, for supporting wheels of nose landing gear of an airplane, at least one force sensor operative to sense force applied to the nose landing gear of the airplane in at least one generally horizontal direction resulting from at least one of airplane pilot-controlled braking, deceleration and acceleration of the airplane, at least one tug wheel driver unit operative to drive the plurality of tug wheels in rotation to provide displacement of the chassis, at least one tug wheel steering mechanism operative to steer the steerable tug wheels during airplane taxiing and at least one tug controller operative at least partially in response to an output of the at least one force sensor indicating airplane pilot-controlled braking of the airplane to operate the at least one tug wheel driver unit so as to reduce the force applied to the nose landing gear of the airplane as the result of the airplane pilot-controlled braking.

Preferably, the towbarless airplane tug also includes at least one rotation detector operative to sense rotation of the airplane nose wheel support turret assembly relative to the chassis resulting at least from pilot-controlled ground steering of the airplane and the at least one tug controller is also operative to control operation of at least the at least one tug wheel steering mechanism, the at least one tug controller being operative at least partially in response to an output of the at least one rotation detector indicating pilot-controlled steering of the airplane to operate the at least one tug wheel steering mechanism so as to steer the steerable tug wheels such that the chassis moves in a direction indicated by the pilot-controlled steering.

There is also provided in accordance with another preferred embodiment of the present invention a towbarless airplane tug including a chassis mounted on a plurality of tug wheels, at least some of the plurality of tug wheels being steerable tug wheels, an airplane nose wheel support turret assembly, rotatably mounted on the chassis, for supporting rotatable wheels of a nose landing gear of an airplane, at least one rotation detector operative to sense rotation of the airplane nose wheel support assembly relative to the chassis, resulting at least from pilot-controlled ground steering of the airplane, at least one tug wheel driver operative to drive the plurality of tug wheels in rotation to provide displacement of the chassis, at least one tug wheel steering mechanism operative to steer the steerable tug wheels and at least one tug controller operative to control operation of at least the at least one tug wheel steering mechanism, the at least one tug controller being operative at least partially in response to an output of the at least one rotation detector indicating airplane pilot-controlled steering of the airplane to operate the at least one tug wheel steering mechanism so as to steer the steerable tug wheels such that the chassis moves in a direction indicated by the pilot-controlled steering.

Preferably, the airplane nose wheel support turret assembly is rotatably mounted on the chassis by bearings. Preferably, the towbarless airplane tug also includes at least one energy absorber assembly mounted between the airplane nose wheel support turret assembly and the chassis for absorbing energy resulting from inertial forces of the tug which would otherwise be applied to the nose landing gear of the airplane.

Preferably, the towbarless airplane tug also includes at least one airplane wheel engagement assembly for placement of the airplane wheels on the airplane nose wheel support turret assembly such that a center of horizontal rotation of the nose landing gear of the airplane lies at a center of rotation of the airplane nose wheel support turret assembly relative to the chassis. Additionally, the at least one airplane wheel engagement assembly is also operative for retaining the airplane nose landing gear wheels in place at a location such that a center of horizontal rotation of the nose landing gear wheels of the airplane lies at the center of rotation of the airplane nose wheel support turret assembly relative to the chassis. Additionally or alternatively, the at least one airplane wheel engagement assembly is adaptive to airplane wheel size for placement of the airplane wheels on the airplane wheel support assembly and retaining the airplane wheels in place at the location such that the nose landing gear wheels of the airplane lie at the center of rotation of the airplane nose wheel support turret assembly relative to the chassis.

Preferably, the airplane nose wheel support turret assembly is pivotably mounted relative to the chassis, for accommodating tilt of the airplane nose landing gear wheels during airplane movement. Additionally or alternatively, the towbarless airplane tug has a tug driver-controlled mode of operation for airplane pushback and an airplane pilot-controlled mode of operation for airplane movement during taxiing following at least one of pushback and landing.

Preferably, the towbarless airplane tug has an autonomous mode of operation for airplane movement during taxiing following at least one of pushback and landing. Additionally, in the autonomous mode of operation, the tug controller is responsive to commands received from an airport command and control center. Additionally or alternatively, in the autonomous mode of operation, the tug controller is responsive to pre-programmed driving pathways and speed limits and to tug location information received from tug mounted tug location functionality.

Preferably, the towbarless airplane tug has an autonomous mode of operation for tug return from a take-off area to a pre-pushback location.

Preferably, the towbarless airplane tug has tug speed control functionality allowing the tug to travel at speeds up to different speed limits at different locations in the airport.

Preferably, the at least one tug controller is operative to control acceleration and deceleration of the tug, thereby to limit the force applied to the nose landing gear of the airplane, the at least one tug controller employing at least one force feedback loop utilizing an input from the at least one force sensor and at least one of the following inputs: an indication of known slopes at various locations along an airplane travel surface traversed by the tug, the locations being identified to the at least one tug controller by tug location and inclination sensing functionality, an indication of wind forces applied to the airplane, an indication of known airplane and tug rolling friction force at various locations along airplane travel surface traversed by the tug, the locations being identified to the at least one tug controller by location sensing functionality and an obstacle detection indication. In another preferred embodiment the at least one force feedback loop utilizes an input from the at least one sensor and the following inputs: an indication of known slopes at various locations along an airplane travel surface traversed by the tug, the locations being identified to the at least one tug controller by tug location and inclination sensing functionality, an indication of wind forces applied to the airplane, an indication of known airplane and tug rolling friction force at various locations along airplane travel surface traversed by the tug, the locations being identified to the at least one tug controller by location sensing functionality and an obstacle detection indication.

Preferably, the at least one tug controller is operative to control speed of the tug and employs at least one speed feedback loop utilizing at least one of the following inputs: an indication of known desired speed at various locations along an airplane travel surface traversed by the tug, obtained by the at least one tug controller using tug location sensing functionality and a predetermined map of the airplane travel surface indicating speed limits therealong and desired speed information supplied to the at least one tug controller from an airplane main controller.

Preferably, the at least one tug controller is operative to control steering of the tug by employing at least one position feedback loop utilizing at least an indication of rotation of the airplane nose landing gear wheels provided by the at least one rotation detector.

There is further provided in accordance with yet another preferred embodiment of the present invention a towbarless airplane tug including a chassis mounted on a plurality of tug wheels, at least some of the plurality of tug wheels being steerable tug wheels, an airplane wheel support assembly, mounted on the chassis, for supporting rotatable wheels of a nose landing gear of an airplane, at least one force sensor operative to sense force applied to the nose landing gear of the airplane in at least one generally horizontal direction, at least one tug wheel driver operative to drive the plurality of tug wheels in rotation to provide displacement of the chassis, at least one tug controller operative to control acceleration and deceleration of the tug thereby to limit the force applied to the nose landing gear of the airplane, the at least one tug controller employing at least one force feedback loop utilizing an input from the at least one force sensor and at least one of the following inputs: an indication of known slopes at various locations along an airplane travel surface traversed by the tug, the locations being identified to the at least one tug controller by tug location and inclination sensing functionality, an indication of wind forces applied to the airplane, an indication of known airplane and tug rolling friction force at various locations along airplane travel surface traversed by the tug, the locations being identified to the at least one tug controller by location sensing functionality and an obstacle detection indication.

Preferably, the at least one tug controller employs at least one feedback loop utilizing an input from the at least one force sensor and at least two of the following inputs: an indication of known slopes at various locations along an airplane travel surface traversed by the tug, the locations being identified to the at least one tug controller by tug location and inclination sensing functionality, an indication of wind forces applied to the airplane, an indication of known airplane and tug rolling friction force at various locations along airplane travel surface traversed by the tug, the locations being identified to the at least one tug controller by location sensing functionality and an obstacle detection indication.

Preferably, the at least one tug controller employs at least one feedback loop utilizing an input from the at least one force sensor and all of the following inputs: an indication of known slopes at various locations along an airplane travel surface traversed by the tug, the locations being identified to the at least one tug controller by tug location and inclination sensing functionality, an indication of wind forces applied to the airplane, an indication of known airplane and tug rolling friction force at various locations along airplane travel surface traversed by the tug, the locations being identified to the at least one tug controller by location sensing functionality and an obstacle detection indication.

Preferably, the towbarless airplane tug also includes at least one energy absorber assembly mounted on the chassis for absorbing forces resulting from inertia of the tug which would otherwise be applied to the nose landing gear of the airplane. Additionally or alternatively, the airplane nose wheel support turret assembly is rotatably mounted on the chassis by bearings.

Preferably, the towbarless airplane tug also includes at least one airplane wheel engagement assembly for placement of the airplane wheels on the airplane wheel support assembly such that the nose landing gear of the airplane lies at a center of rotation of the airplane wheel support assembly relative to the chassis. Additionally, the at least one airplane wheel engagement assembly is also operative for retaining the airplane wheels in place at a location such that the nose landing gear wheels of the airplane lie at a center of rotation of the airplane wheel support turret assembly relative to the chassis. Additionally or alternatively, the at least one airplane wheel engagement assembly is adaptive to airplane wheel size for placement of the airplane wheels on the airplane wheel support assembly and retaining the airplane wheels in place at the location such that the nose landing gear of the airplane lies at the center of rotation of the airplane wheel support assembly relative to the chassis.

Preferably, the at least one energy absorber assembly includes multiple pistons which absorb energy upon acceleration or deceleration of the tug relative to the airplane.

Preferably, the at least one tug controller is responsive to input signals from an airport command and control system.

There is even further provided in accordance with still another preferred embodiment of the present invention a towbarless airplane tug including a chassis mounted on a plurality of tug wheels, at least some of the plurality of tug wheels being steerable tug wheels, an airplane wheel support assembly, mounted on the chassis, for supporting rotatable wheels of a nose landing gear of an airplane, at least one tug wheel driver operative to drive the plurality of tug wheels in rotation to provide displacement of the chassis and at least one tug controller operative to control speed of the tug, the at least one tug controller employing at least one feedback loop utilizing a mapping of speed limits along a travel path traversed by the tug and the airplane at the airport as well as an indication of the instantaneous location of the tug and the airplane along a travel path.

BRIEF DESCRIPTION OF THE DRAWINGS

The present invention will be understood and appreciated more fully from the following detailed description, taken in conjunction with the drawings in which:

FIG. 1B is a sectional illustration of a towbarless airplane tug constructed and operative in accordance with a preferred embodiment of the present invention, taken along the lines 1B-1B in FIG. 1A;

FIG. 1C is a top view illustration of the towbarless airplane tug of FIGS. 1A & 1B;

FIGS. 2A, 2B, 2C, 2D, 2E, 2F, 2G, 2H, 2I and 2J are respective pictorial illustrations of various stages in the pre-pushback and pushback operation of the towbarless airplane tug of FIGS. 1A-1C;

FIGS. 3A, 3B, 3C, 3D and 3E are respective pictorial illustrations of various stages in pilot controlled taxiing operation of the towbarless airplane tug of FIGS. 1A-1C in accordance with one embodiment of the present invention;

FIGS. 4A, 4B, 4C, 4D and 4E are respective pictorial illustrations of various stages in autonomous taxiing operation of the towbarless airplane tug of FIGS. 1A-1C in accordance with an alternative embodiment of the present invention;

FIGS. 5A, 5B, 5C, 5D and 5E are respective pictorial illustrations of various stages in the autonomous return operation of the towbarless airplane tug of FIGS. 1A-1C; and FIGS. 6A, 6B and 6C are respective diagrammatical illustrations of steering functionality of the towbarless airplane tug of FIGS. 1A-1C.

DETAILED DESCRIPTION OF PREFERRED EMBODIMENTS

The present invention relates to novel robotic tugs for taxiing airplanes from a gate to a take-off runway without using the aircraft jet engines. In accordance with a preferred embodiment of the present invention, the robotic tugs preferably operate in an airplane pilot-controlled taxi mode wherein the airplane pilot steers and brakes as if the airplane were moving under its own engine power and the tug speed is controlled by a controller. Upon completion of the airplane taxi the tug preferably returns autonomously to a pre-pushback location at the gate, controlled by an airport command and control system. Preferably, a tug driver performs the pushback operation, after which he leaves the tug and the airplane pilot controls the tug during taxi. In accordance with an alternative embodiment of the present invention, the tug may operate in an autonomous mode of operation during airplane taxi. The term "autonomous" is used throughout in a broad sense to include operation under the control of an airport command, control and communication system, preferably subject to airplane pilot override.

Figure 1A:
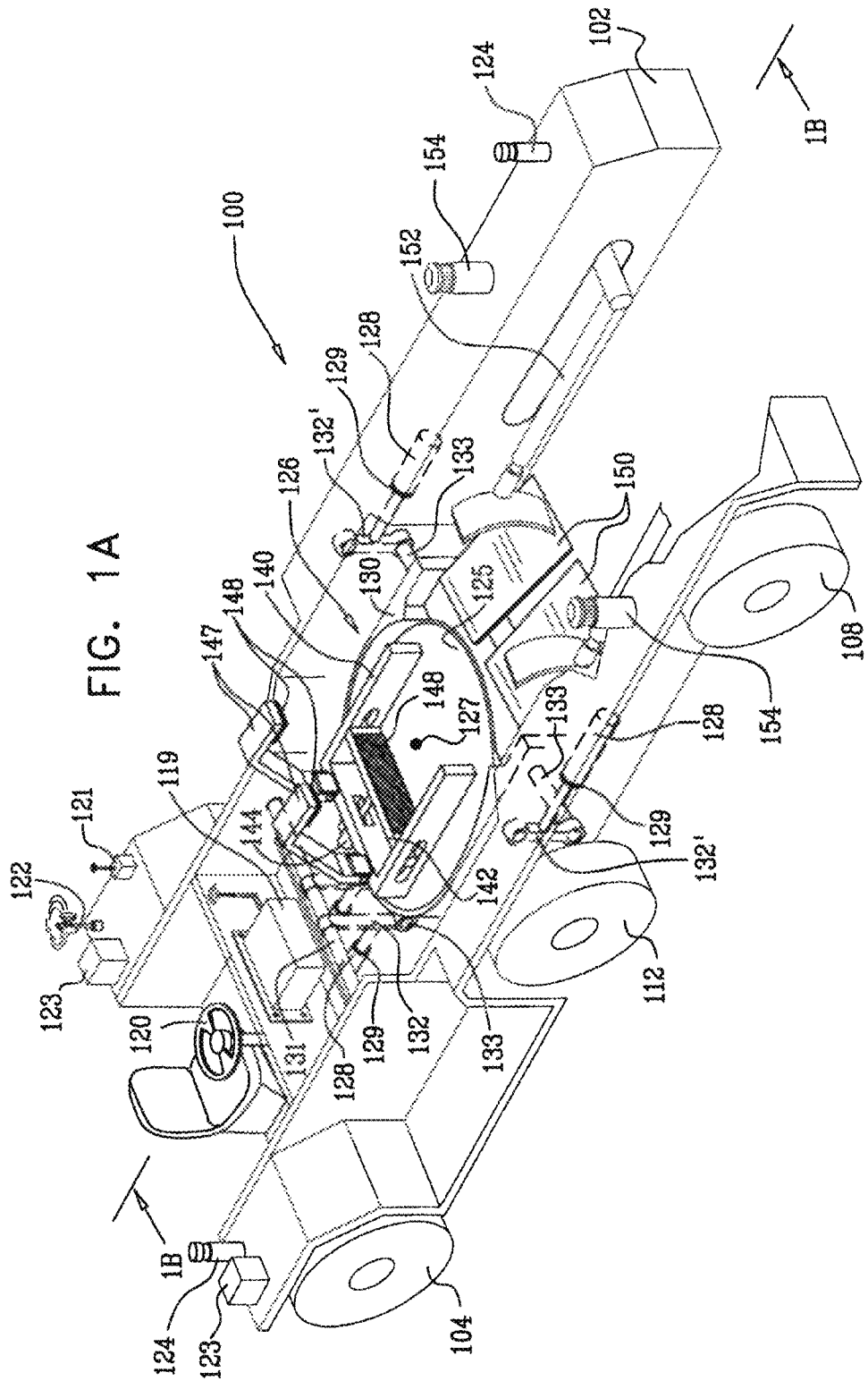
FIG. 1A is a pictorial illustration of a towbarless airplane tug constructed and operative in accordance with a preferred embodiment of the present invention.

Reference is now made to FIGS. 1A, 1B and 1C which illustrate a towbarless airplane tug 100 constructed and operative in accordance with a preferred embodiment of the present invention. As seen in FIGS. 1A, 1B and 1C, the towbarless tug 100 preferably comprises a chassis 102 supported on six wheels, including forward steerable wheels 104 and 106, rearward steerable wheels 108 and 110 and intermediate non-steerable wheels 112 and 114. It is appreciated that wheels 112 and 114 may alternatively be steerable as well. The centers of rotation of steerable wheels 104, 106, 108 and 110, respectively indicated by reference numerals 115, 116, 117 and 118, preferably define vertices of a rectangle, whose length A is defined by the separation between the centers of rotation of respective forward and rearward wheels on the same side of the tug 100 and whose width B is defined by the separation between the centers of rotation 115 and 116 of respective forward wheels 104 and 106 and between the centers of rotation 117 and 118 of respective rearward wheels 108 and 110.

Each of wheels 104, 106, 108, 110, 112 and 114 is preferably controllably driven by a corresponding hydraulic motor (not shown) powered by a corresponding hydraulic pump (not shown) driven by the vehicle diesel engine (not shown) in response to speed and torque control signals from a controller 119. Each of the steerable wheels 104, 106, 108 and 110 is preferably steerable by one or more steering pistons (not shown) in response to steering control signals from controller 119.

A driver control interface assembly, preferably including a steering wheel 120, brakes (not shown) and optionally other controls, preferably interfaces with controller 119 to enable a driver to govern the operation of the towbarless airplane tug 100 prior to and during pushback, and/or in the event of an emergency or a tug control system malfunction. In accordance with a preferred embodiment of the present invention, the towbarless airplane tug 100 operates under airplane pilot in control (PIC), via controller 119 to taxi to or near a take-off point. Near the take-off point, the controller 119 automatically disengages the tug 100 from the airplane, in response to a command received from an airport Command and Control Center or from a tug location sensor 121, such as a GPS sensor or any other suitable tug location sensor, and the tug 100 operates under control of controller 119, to return autonomously from the take-off point to a desired pre-push back location. Tug 100 is also preferably equipped with a wind sensor 122, one or more obstacle detection sensors 123, such as radar and/or laser sensors, for example a Velodyne HDL-64E laser scanner, which output to controller 119, and one or more driving cameras 124, which enable remote driving of tug 100, such as by a remote command and control center. Driving cameras 124 may be rotatable to have selectable pan and tilt so as to enable an operator to view various locations on or near the tug 100.

In accordance with a preferred embodiment of the present invention, a rotatable airplane nose landing gear wheel support turret 125 is pivotably and rotatably mounted on a horizontal base assembly 126. The steady state center of rotation of the turret 125, designated by reference numeral 127, is preferably at the geometrical center of the rectangle defined by the centers of rotation 115, 116, 117, and 118 of respective steerable wheels 104, 106, 108 and 110.

Horizontal base assembly 126 is connected to the chassis 119 in a manner which allows a limited amount of freedom of movement of horizontal base assembly 126 relative to chassis 102, and is engaged by an energy absorber assembly preferably comprising a plurality of energy absorbing pistons 128, each of which is pivotably coupled to the chassis 102 and to horizontal base assembly 126. Force sensors, preferably load cells 129, are preferably associated with each of energy absorbing pistons 128, which output to controller 119, and are used by controller 119 in controlling vehicle acceleration and deceleration.

Horizontal base assembly 126 preferably comprises a circumferential base element 130, which is pivotably mounted onto chassis 102 by being suspended from a transversely extending support rod 131 on a pair of forward hanging supports 132, and suspended on a pair of rearward hanging supports 132' which are pivotably mounted onto chassis 102. Rearward hanging supports 132' are engaged by pivotably mounted energy absorbing pistons 128. Mounting of circumferential base element 130 onto rearward hanging supports 132' is preferably by means of pivotable axles 133, which may or may not be integrally formed with circumferential base element 130.

Turret 125 is preferably pivotably and rotatably mounted onto base 126 by a pair of pivot rods 134 extending outwardly therefrom into engagement with high load capacity bearings 135, which in turn, engage a 360 degree circumferential bearing race 136 formed in base 126. This arrangement provides both relatively low friction rotatability and tiltability of turret 125 relative to the base element 130, the horizontal base assembly 126, and chassis 102.

An upstanding frame 140 is fixedly mounted onto turret 125 for aligning the airplane nose landing gear wheel on the turret 125. An airplane nose landing gear wheel stop bar 142 is preferably selectably positioned with respect to upstanding frame 140 by a stop bar positioning piston 144, anchored on turret 125, for adapting turret 125 to different sizes of airplane nose landing gear wheels. The rotational orientation of the turret 125 is preferably sensed by a rotation sensor 145, such as a potentiometer, which provides a turret rotational orientation input to controller 119. Rotational orientation of the turret 125 may be governed by a turret rotation motor 146.

A selectably positionable clamp assembly 147 is preferably mounted on turret 125 and connected to upstanding frame 140 and is operative to selectably clamp airplane nose landing gear wheels onto turret 125 such that the center of rotation of the airplane nose landing gear wheels lies, insofar as possible, exactly at the center of rotation 127 of turret 125, which, as noted above, lies at the geometrical center of the rectangle defined by the centers of rotation of steerable wheels 104, 106, 108 and 110.

Preferably, force sensors, such as load cells 148, are mounted onto a forward facing surface of selectably positionable clamp assembly 147 and onto a rearward facing surface of stop bar 142, so as to engage the airplane nose landing gear wheels to sense forces in the horizontal plane which are being applied to airplane nose landing gear wheels and thus to the airplane nose landing gear, such as due to differences in acceleration and/or deceleration of the tug 100 relative to acceleration and/or deceleration of an airplane being towed thereby.

An inclined airplane nose landing gear wheel ramp 150 is preferably mounted onto base element 130. A pair of airplane nose landing gear wheel engaging piston assemblies 152 is preferably provided for pushing and lifting the airplane nose landing gear and positioning the airplane nose landing gear wheels onto turret 125.

It is a particular feature of the present invention that the force sensors, such as load cells 148, are operative to sense forces applied to the nose landing gear in at least one generally horizontal direction resulting at least from airplane pilot-controlled braking of the airplane, producing tug deceleration, and resulting from tug acceleration. The controller 119 is operative at least partially in response to an output of a force sensor indicating inter alia airplane pilot-controlled braking, resulting in deceleration of the airplane to provide speed and torque control signals to the hydraulic motors which drive the wheels of the tug 100. The control is such as to reduce and limit the force applied to the nose landing gear of the airplane, to a maximum allowed force which will not damage the nose landing gear of the airplane as a result of airplane pilot-controlled braking resulting in tug deceleration and/or tug acceleration.

It is additionally a particular feature of the present invention that the rotation sensor 145 is operative to sense rotation of the turret 125 relative to base assembly 126, which is produced by airplane pilot steering via the nose landing gear of the airplane, and the controller 119 is operative to control steering of steerable wheels 104, 106, 108 and 110 based on the output of rotation sensor 145 and thus in response to airplane pilot steering commands.

It is a further particular feature of the present invention that the force sensors, such as load cells 129 and 148, are operative to sense forces applied to the nose landing gear in at least one generally horizontal direction resulting such that the controller 119 is operative to control acceleration and deceleration of the tug by employing at least one force feedback loop utilizing an output of at least one force sensor, sensing pilot-controlled braking and at least one of the following inputs:

an indication of force induced by known slopes at various locations along an airplane travel surface traversed by the tug 100, the locations being identified to the controller by location sensing functionality;

an indication of wind forces applied to the airplane, information regarding the wind forces being supplied to the controller from airport and/or tug mounted wind sensors; and an indication of known tug and airplane rolling friction forces at various locations along the airplane travel surface traversed by the tug, the locations being identified to the controller by location sensing functionality.

It is a further particular feature of the present invention that the controller 119 is operative to control the speed of the tug 100 by employing at least one speed feedback loop based on known speed limits along a travel path traversed by the tug and the airplane, preferably utilizing a suitable airport map embedded in the controller 119, and an output of a tug location sensor, indicating the position of the tug 100 along the travel path of the tug 100 and the airplane.

In accordance with an embodiment of the invention a pair of laser range finders 154 are mounted on chassis 102 of tug 100 for ascertaining the angular relationship between the longitudinal axis of the airplane and the longitudinal axis of the tug 100. The angular relationship between the longitudinal axis of the airplane and the longitudinal axis of the tug 100 is employed particularly in an autonomous taxiing mode of operation such as that described hereinbelow in FIGS. 4A-4E.

Reference is now made to FIGS. 2A, 2B, 2C, 2D, 2E, 2F, 2G, 2H, 2I and 2J, which are respective pictorial illustrations of various stages in the pre-pushback and pushback operation of the towbarless airplane tug of FIGS. 1A-1C, preferably under tug driver control.

Figure 2A:
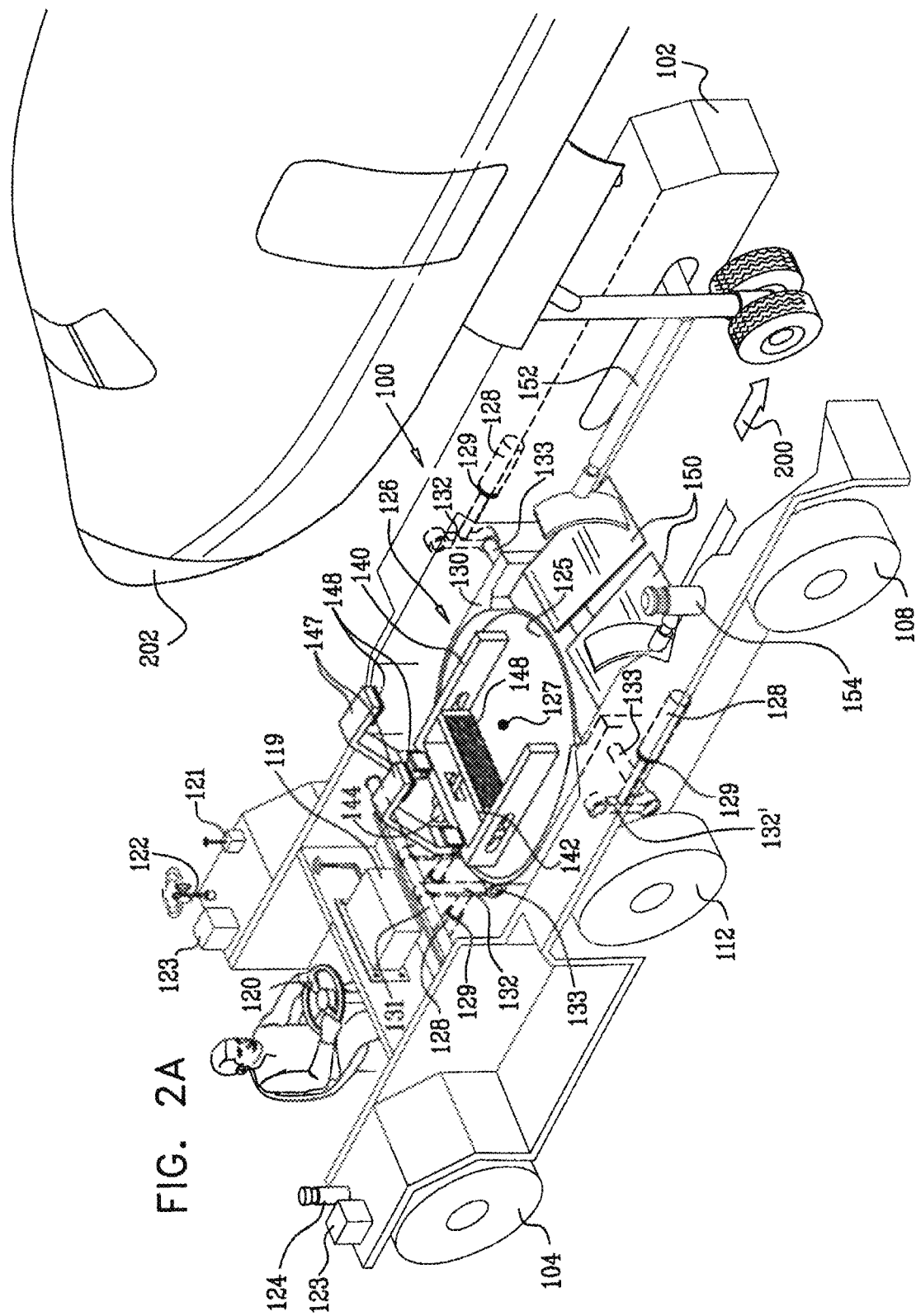
Figure 2B:
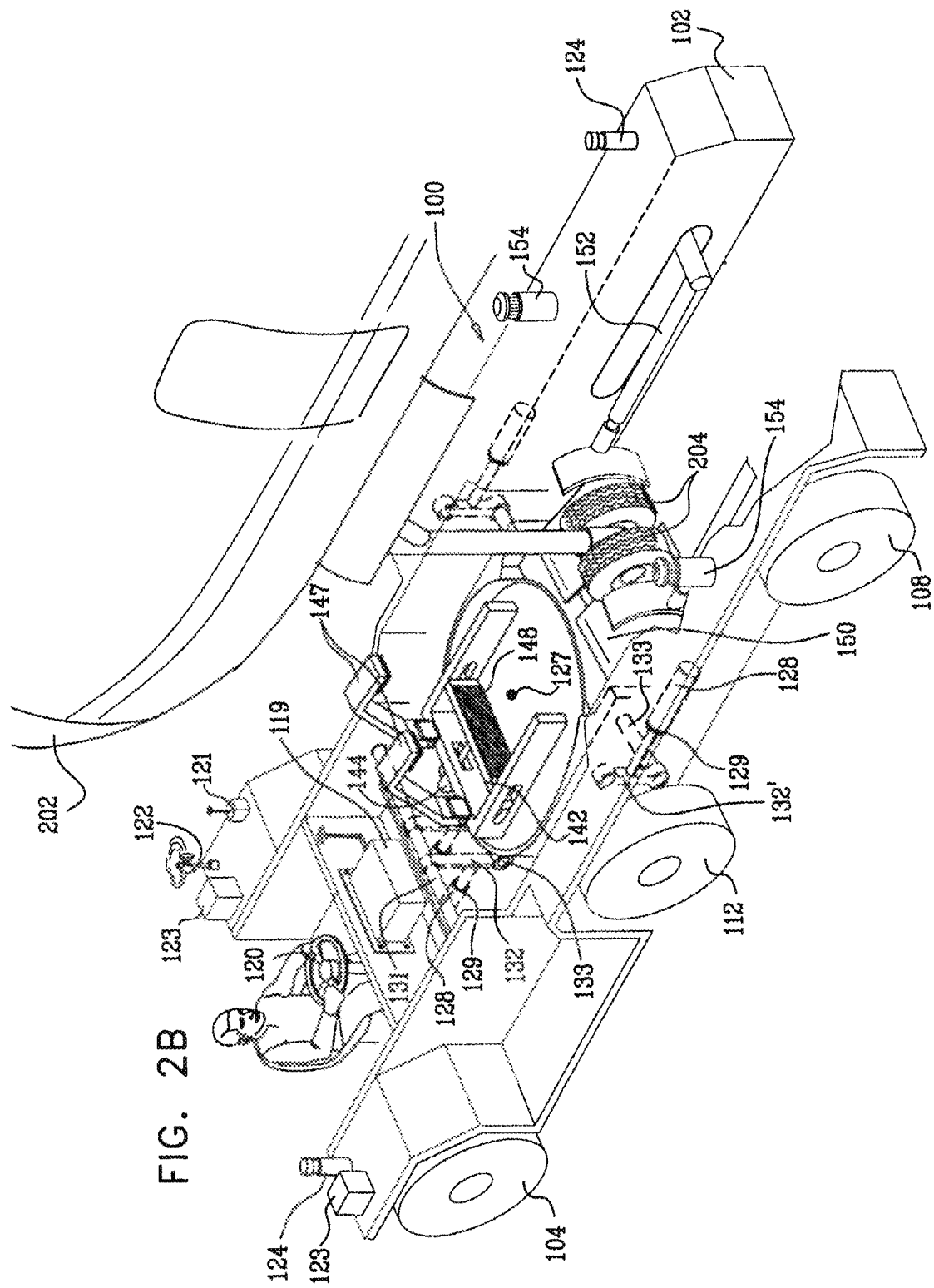
Figure 2C:
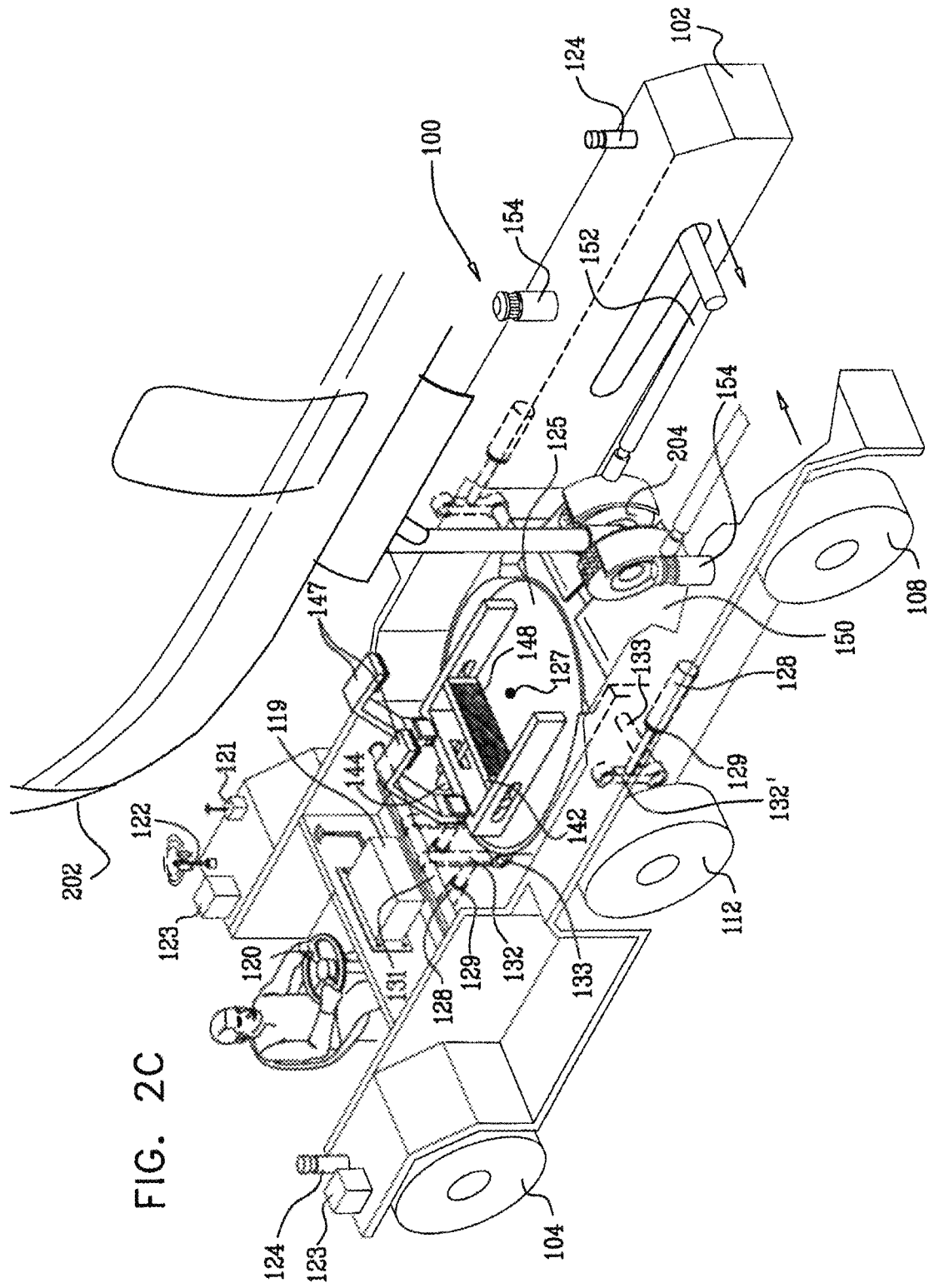
Figure 2D:
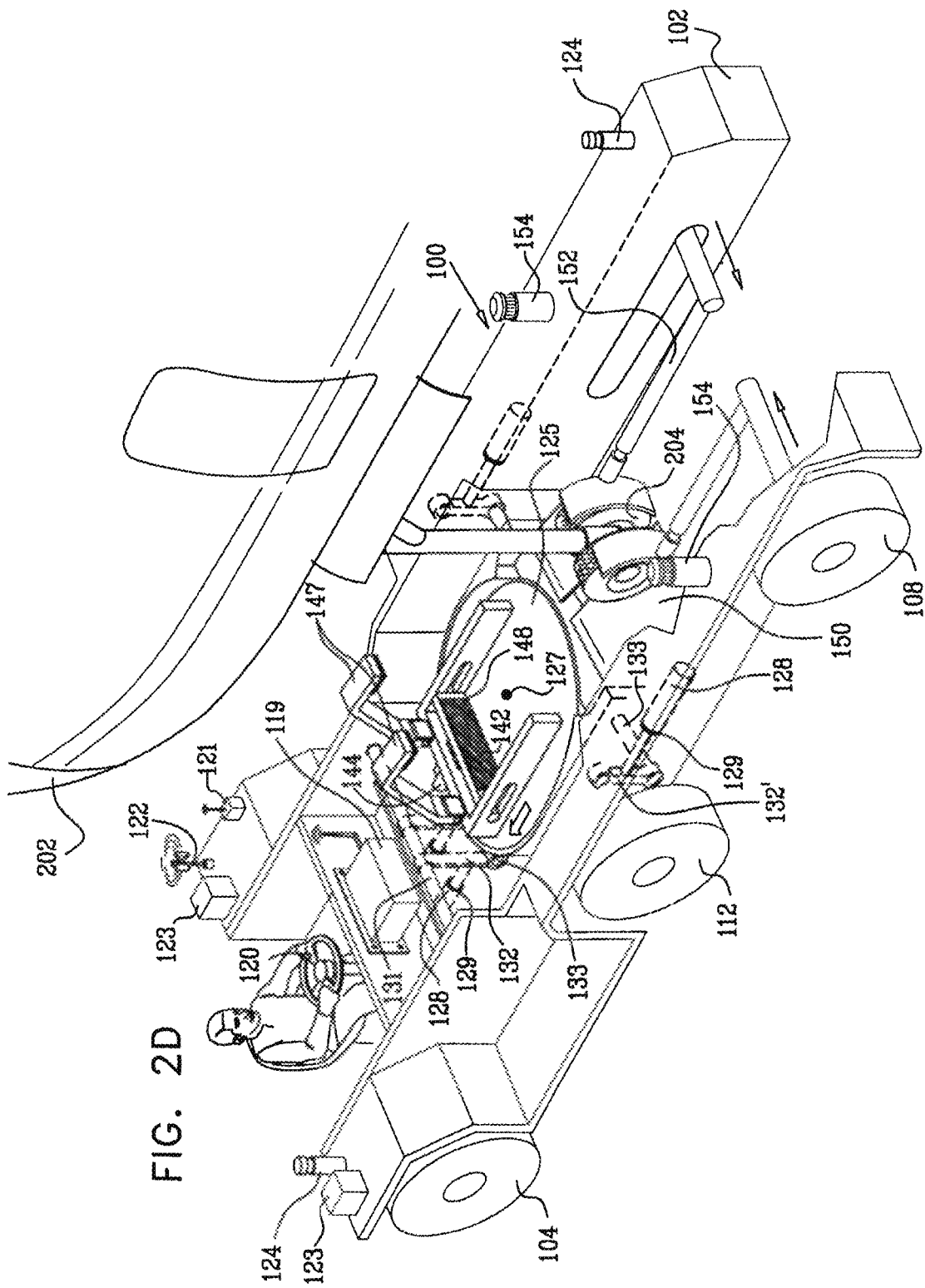
Figure 2E:
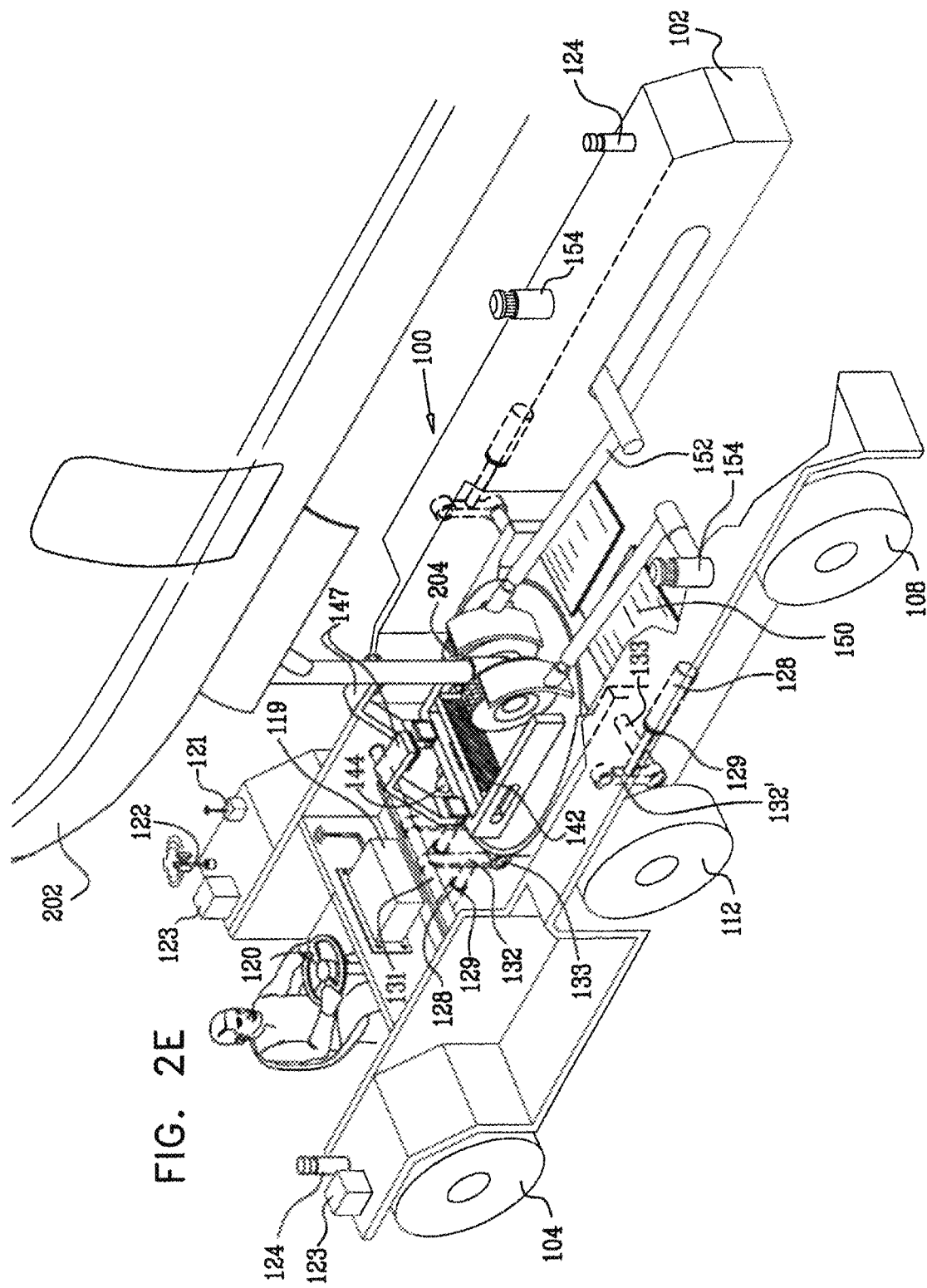

As seen in FIG. 2A, towbarless airplane tug 100, constructed and operative in accordance with a preferred embodiment of the present invention, is moved, under the control of a tug driver, in a direction indicated by an arrow 200, towards an airplane 202 awaiting pushback. FIG. 2B show the nose landing gear wheels 204 located on ramp 150. FIG. 2C shows nose landing gear wheel engaging piston assemblies 152 positioned in engagement with nose landing gear wheels 204 for pushing and lifting the airplane nose landing gear and positioning the airplane nose landing gear wheels onto turret 125. FIG. 2D shows suitable positioning of airplane nose landing gear wheel stop bar 142 with respect to upstanding frame 140 by a stop bar positioning piston 144 to accommodate the specific airplane nose landing gear wheels 204 of the specific airplane 202. FIG. 2E shows nose landing gear wheels 204 being pushed onto turret 125.

Figure 2F:
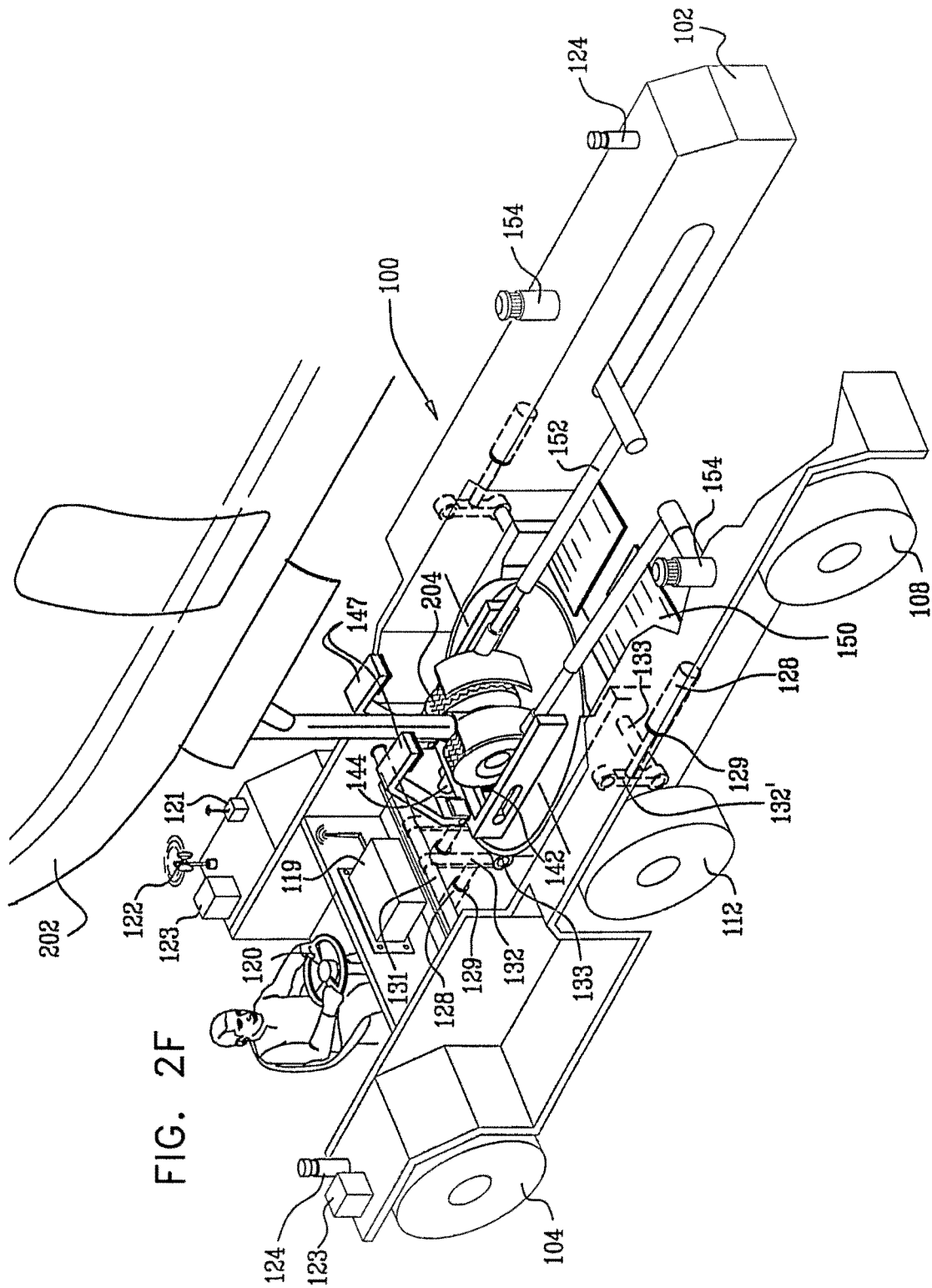

FIG. 2F shows the airplane nose landing gear wheels 204 pushed by piston assemblies 152 against suitably positioned stop bar 142, such that the axis of rotation of the airplane nose landing gear wheels 204 preferably lies insofar as possible exactly at the center of rotation 127 of turret 125, which, as noted above, lies at or close to the geometrical center of the rectangle defined by the centers of rotation of steerable wheels 104, 106, 108 and 110.

Figure 2H:
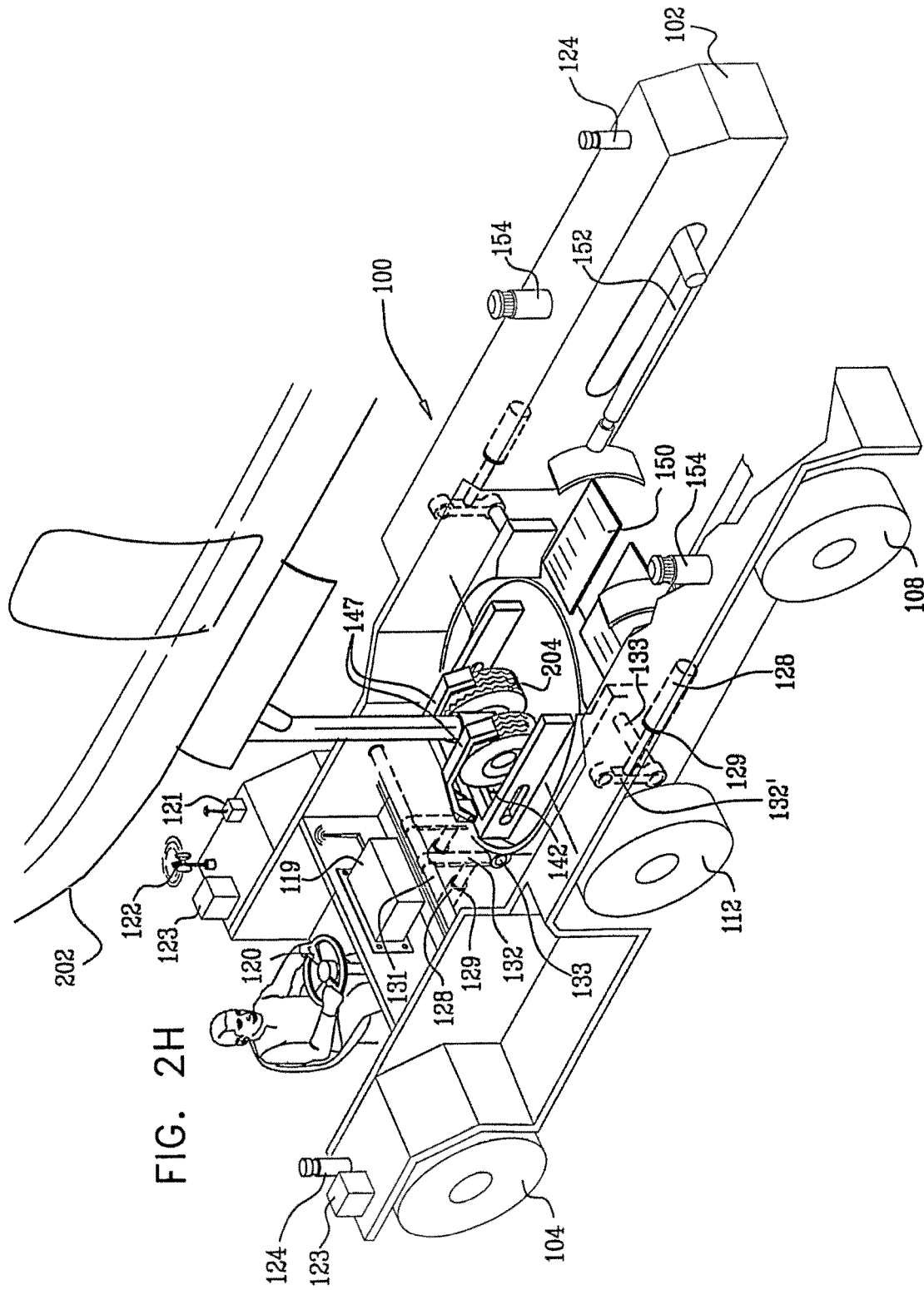
Figure 21:
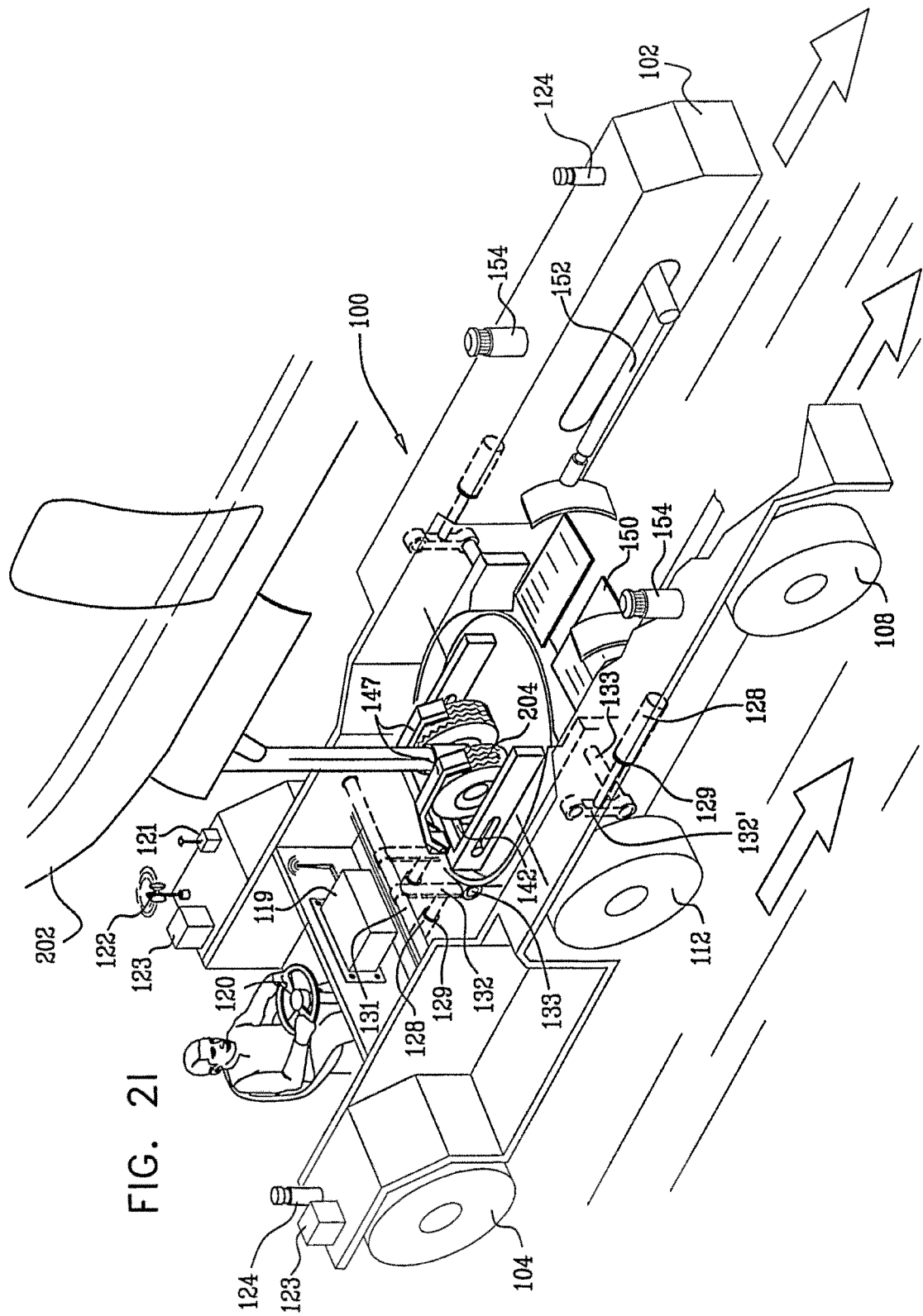
Figure 2J:
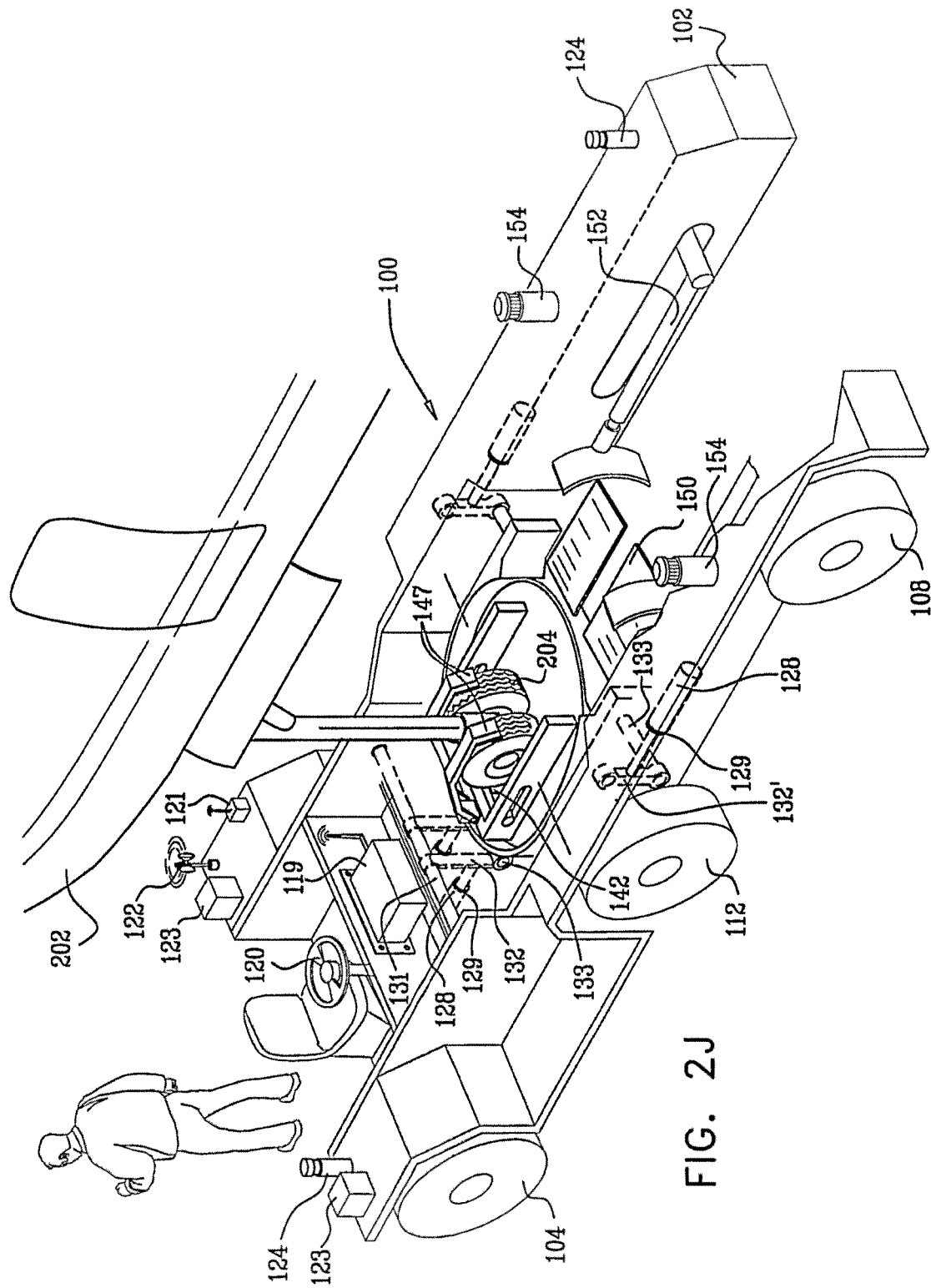

FIGS. 2G and 2H shows a sequence of retraction of individual piston assemblies 152 out of engagement with airplane nose landing gear wheels 204 and engagement of individual clamps of selectably positionable clamp assembly 147 with airplane nose landing gear wheels 204 to clamp airplane nose landing gear wheels onto turret 125 such that the center of rotation of the airplane nose landing gear wheels lies insofar as possible exactly at the center of rotation 127 of turret 125. FIG. 2I shows pushback of the airplane 202 by tug 100 under control of the driver of the tug. FIG. 2J shows the tug driver leaving the tug 100 following completion of pushback. According to an alternative embodiment of the invention, the driver remains on tug 100 during all or part of taxiing and may participate in disengagement of the tug from the airplane following engine start up.

Reference is now made to FIGS. 3A, 3B, 3C, 3D and 3E, which are pictorial illustrations of various stages in the taxiing operation of the towbarless airplane tug 100 of FIGS. 1A-1C under airplane pilot control with the assistance of controller 119.

Figure 3A:
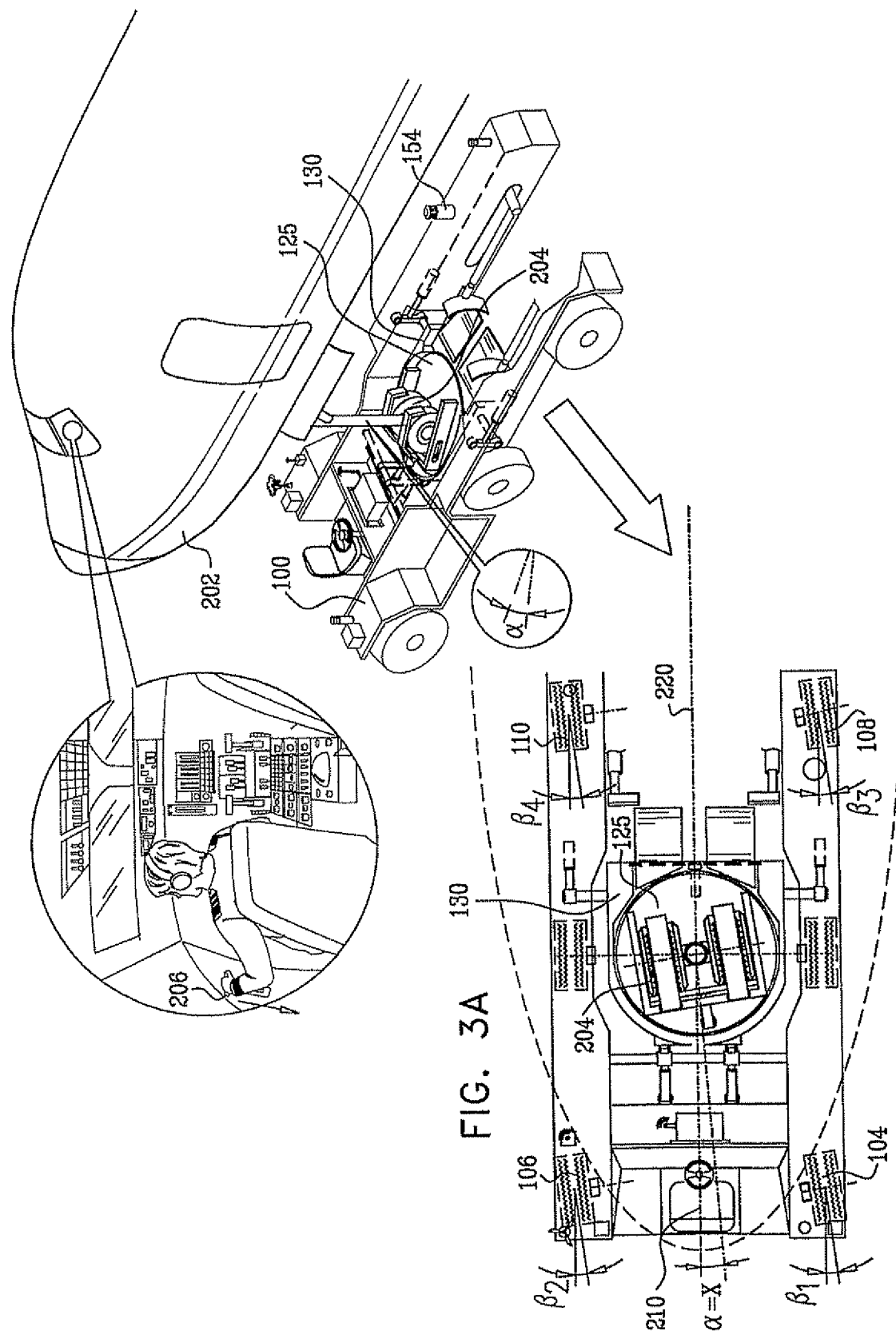

FIG. 3A shows rotation of the airplane nose landing gear wheels 204 by the airplane pilot using the conventional airplane steering tiller 206 or pedals (not shown), producing corresponding rotation of turret 125 relative to base element 130. Rotation of turret 125 is immediately sensed by rotation sensor 145 which provides an output to controller 119 resulting in immediate rotation of steerable wheels 104, 106, 108 and 110 of tug 100, as described hereinbelow in greater detail with reference to FIGS. 6A-6B.

Controller 119 preferably performs steering of tug 100 in accordance with a feedback control loop which receives an input from rotation sensor 145 indicating an angle $\alpha$ between the direction of the wheels 204 of the nose landing gear as steered by the airplane pilot, and thus of turret 125, with the longitudinal axis of the tug 100, here designated by reference numeral 210. The controller 119 rotates tug steerable wheels 104, 106, 108 and 110 at respective angles $\beta_1$, $\beta_2$, $\beta_3$ and $\beta_4$, as described hereinbelow with reference to FIGS. 6A-6C, and drives tug 100 such that angle $\alpha$ goes to zero.

Figure 3B:
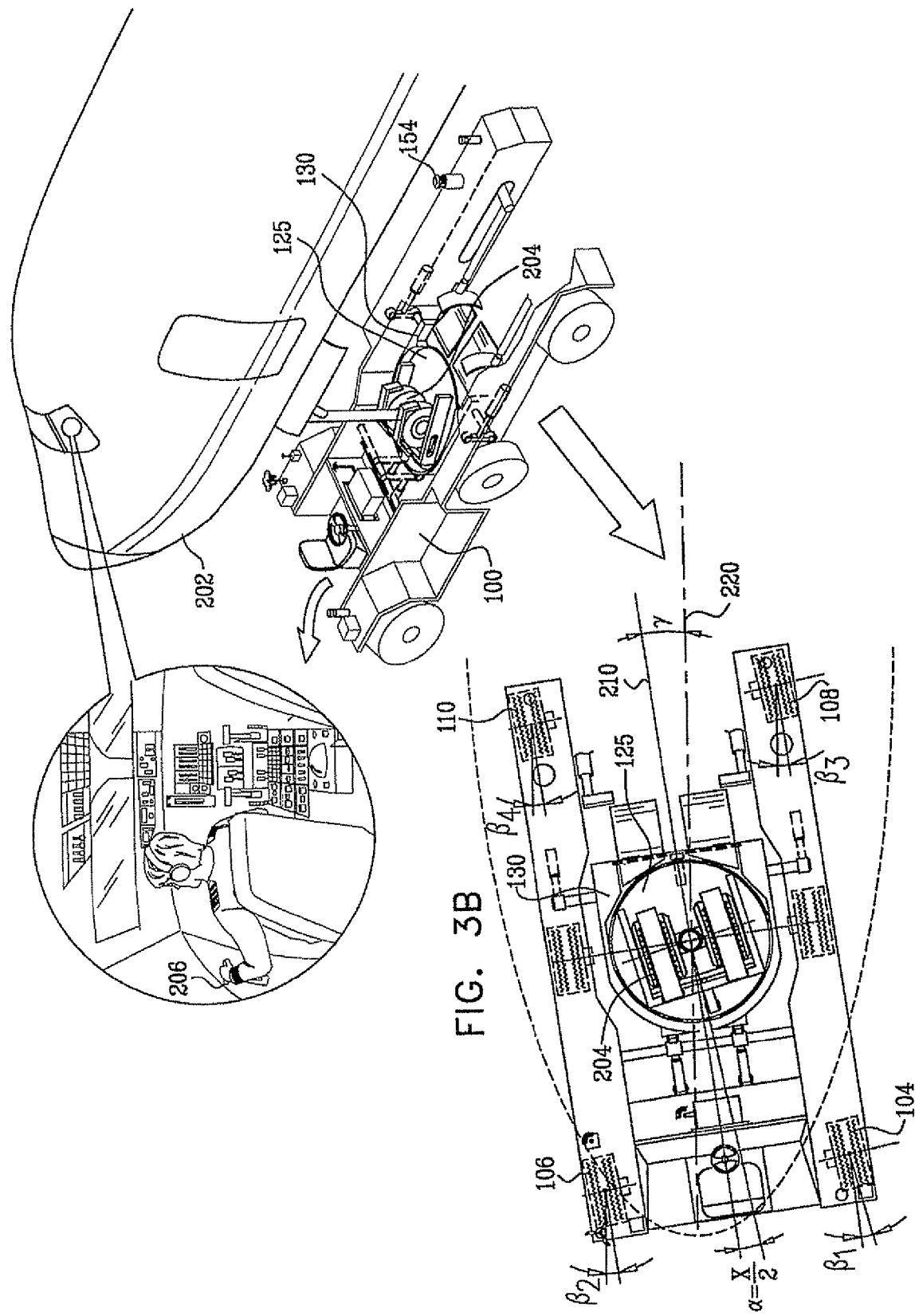

FIG. 3B shows an intermediate stage during movement of tug 100 to orient the tug 100 such that the airplane 202 is pulled by the tug 100 in the direction indicated by the airplane pilot. At this stage the angle $\alpha$ between the turret 125 and the longitudinal axis 210 of tug 100 is shown to be one-half of that shown in FIG. 3A. An angle $\gamma$ is indicated between the longitudinal axis 210 of the tug 100 and the longitudinal axis of the airplane 202 being towed by tug 100, here designated by reference numeral 220, due to turning of the tug 100 relative to the airplane 202.

FIG. 3C shows the tug 100 oriented with respect to the wheels 204 of the nose landing gear of the airplane 202 such that $\alpha$ is zero. It is noted that the angles $\beta_1$, $\beta_2$, $\beta_3$ and $\beta_4$ of the tug steerable wheels 104, 106, 108 and 110, respectively, are typically not zero. At this stage the angle $\gamma$ between the longitudinal axis 210 of the tug 100 and the longitudinal axis 220 of the airplane 202 being towed by tug 100 is less than $\gamma$ in FIG. 3B, inasmuch as the airplane 202 has begun to turn.

Figure 3D:
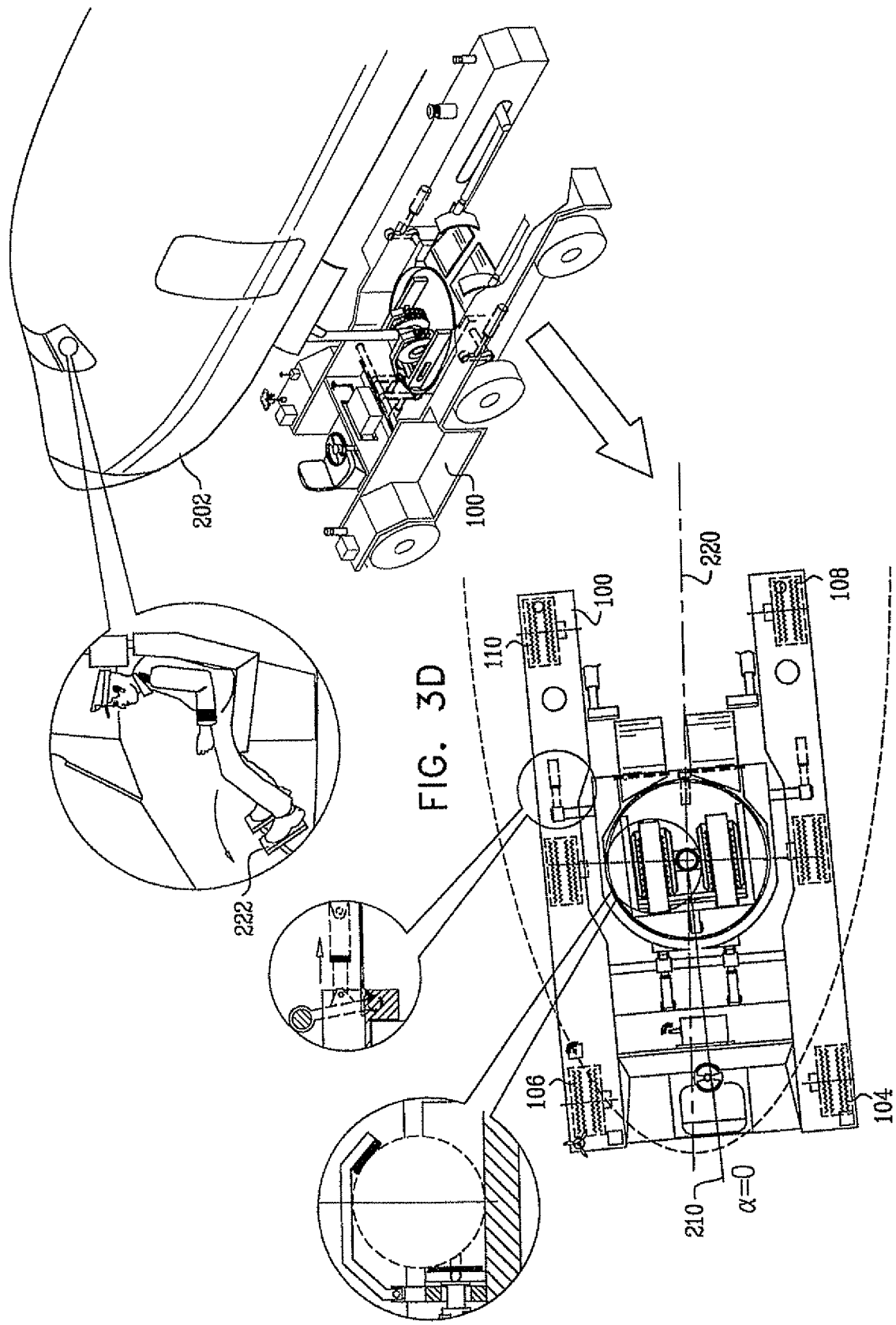

FIG. 3D shows braking of the airplane 202, by the airplane pilot pressing on pedals 222. Braking of the airplane 202 is performed by brakes on the main landing gear (not shown) of the airplane 202 and immediately causes the application of a force sensed by the load cells 148 on clamps 147, the output of which is received by controller 119, which immediately decelerates the tug 100. Inasmuch as there is a time lag between braking of the airplane 202 and corresponding deceleration of the tug 100, forces are applied to rearward energy absorbing pistons 128 which are immediately sensed by load cells 129. Rearward energy absorbing pistons 128 absorb the energy produced by braking of the airplane 202 relative to the tug 100. At this stage load cells 129 serve as a back up to load cells 148.

FIG. 3E shows controlled acceleration of the tug 100 governed by controller 119 in response, inter alia, to inputs received from force sensors such as load cells 148 and 129, to provide airplane taxi velocity which is within predetermined speed limits at predetermined locations along an airplane travel path and to ensure that forces applied to the nose landing gear do not exceed predetermined limits, taking into account one or more, and preferably all of the following factors:

force induced by known slopes at various locations along an airplane travel surface traversed by the tug 100, the locations being identified to the controller 119 by location sensing functionality, such as GPS functionality, here provided by a tug mounted tug location sensor 121 (FIGS. 1A-1C);

wind forces applied to the airplane 202, information regarding the wind forces being supplied to the controller 119 from airport or tug-mounted wind sensors, such as tug mounted wind sensor 122, and preferably also via airport command and control functionality; and tug 100 and airplane 202 rolling friction forces at various locations along the airplane travel surface traversed by the tug 100, the locations being identified to the controller 119 by the location sensing functionality provided by tug location sensor 121, and preferably also via airport command and control functionality.

FIG. 3E also contemplates controlled deceleration of the tug 100 responsive not only to airplane pilot braking of the airplane 202, but also to detection of an obstacle sensed by an obstacle sensor 123 (FIGS. 1A-1C). The tug deceleration is governed by controller 119 in response, inter alia, to inputs received from force sensors, such as load cells 148 and 129, to ensure a coordinated deceleration ratio between the airplane and the tug, thereby to limit the forces applied to nose landing gear of the airplane 202 to within predetermined force limits.

In order to distinguish between normal traction forces on the nose landing gear and forces applied by the pilot braking, the controller 119 takes into account one or more, and preferably all of the factors described above, which are indicated by data from the various sensors, such as sensors 120, 121, 122 and 123 and cameras 124.

Controller 119 is operative to govern acceleration and deceleration of tug 100 so as to maintain a desired tug speed preferably by employing a speed control feedback loop. The controller 119 has an embedded map of the airport indicating relevant tug speed limits at various regions of the tug travel path. This speed limit information is coordinated with information indicating instantaneous location of the tug 100, which is preferably provided by tug location sensor 121. The controller 119 preferably includes an inertial navigation system which indicates the instantaneous speed of the tug 100. The feedback loop operates to cause the actual speed to be as close as possible to and not to exceed the speed limit for the instantaneous location of the tug 100.

Controller 119 is also operative to govern acceleration and deceleration of tug 100 so as to limit the horizontal forces applied to the nose landing gear of the airplane 202 to an acceptable limit, which is currently 6% of the airplane gross weight, preferably by employing a force control feedback loop. Controller 119 receives inputs from load cells 148 and 129, which indicate the sum of the forces applied to the nose landing gear of the airplane 202, resulting from, inter alia, wind, slopes, rolling friction and acceleration or deceleration of the airplane 202 and/or the tug 100. The force feedback loop is operative to accelerate or decelerate the tug 100 such as to maintain the forces sensed by load cells 148 and 129 sufficiently below the acceptable limit, so as to leave a margin for unexpected accelerations or decelerations of either the airplane 202 or the tug 100.

Reference is now made to FIGS. 4A, 4B, 4C, 4D and 4E, which are pictorial illustrations of various stages in autonomous taxiing operation of the towbarless airplane tug 100 of FIGS. 1A-1C in accordance with an alternative embodiment of the present invention. The autonomous taxiing operation may be initiated by a driver of the tug 100 or automatically in response to a command from the airport command and control center following completion of pushback.

In autonomous taxiing operation, a function of turret 125 is to reduce the forces which are applied to the nose landing gear in the horizontal plane, specifically torque, to zero, by maintaining the position of the nose landing gear wheels 204 in the position last selected by the airplane pilot, typically parallel to the longitudinal axis 220 of the airplane. As a result the nose landing gear remains in that position while the tug 100 changes its heading along its travel path. This means that in most of the steering maneuvers of the tug 100 the turret will be turned in a direction opposite to that of the tug 100.

Autonomous tug control may be overridden immediately by the airplane pilot by operating the airplane brakes on the main landing gear, which is immediately sensed by load cells 148 and 129.

Autonomous taxiing preferably employs enhanced C4 functionality of an airport command and control center which coordinates and optimizes the taxi travel path and speed of all of the taxiing airplane in the airport, utilizing the following inputs:

Positions of all the airplanes taxiing in the airport;

Calculation of all airplane taxi clearances and taxi travel pathways; and

Airfield meteorological conditions and taxiway ground travel conditions.

This enhanced C4 functionality preferably provides the following functions:

avoidance of runway incursions;

calculating optimal taxiing speeds for all the airplanes to insure minimal starts and stops during taxiing;

minimizing traffic jams on the taxiways; and enabling immediate pilot control in the event of a malfunction or emergency.

Figure 4A:
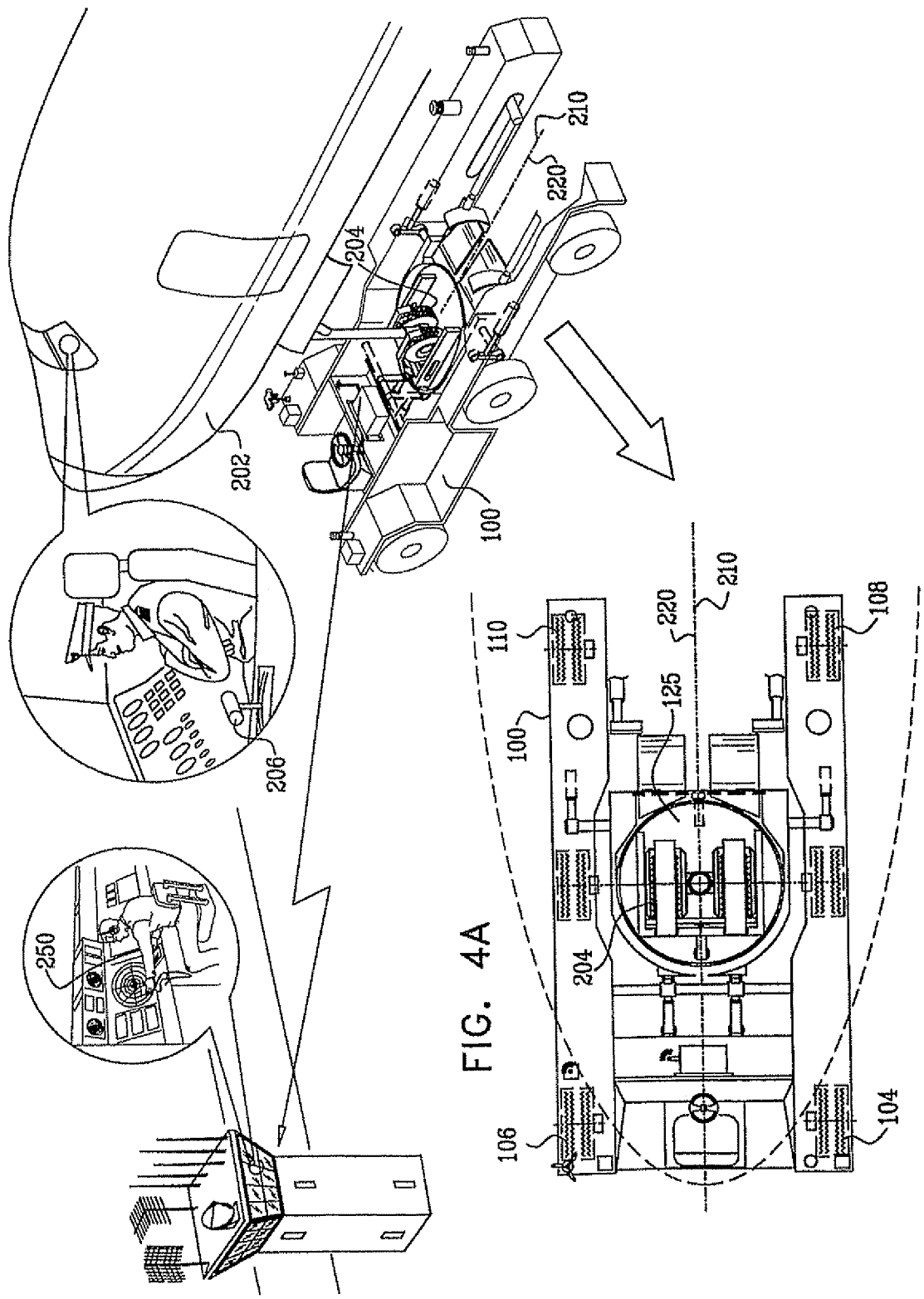

FIG. 4A shows an initial orientation of the tug 100 and the airplane 202 at the beginning of autonomous taxiing operation. The airplane nose landing gear wheels 204 lie parallel to the longitudinal axis 210 of the tug 100 and to the longitudinal axis 220 of the airplane. The steerable wheels 104, 106, 108 and 110 of the tug 100 also lie parallel to axes 210 and 220.

FIG. 4B shows initial turning of the tug 100 under control of controller 119, preferably responsive to traffic control instructions received from an airport command and control system 250 which may be based on a C4 (command, control & communication center) system. As seen in FIG. 4B, in this embodiment, the airplane pilot does not use the conventional airplane steering tiller 206 or pedals (not shown), except for emergency braking. Desired steering of the tug 100 is produced in response to suitable instructions from controller 119 by rotation of steerable wheels 104, 106, 108 and 110 of tug 100. In order to avoid application of torque to the nose landing gear of the airplane 202, turret 125 is rotated by turret rotation motor 146 by an angle $-\alpha$ equal and opposite to the angle $\alpha$ between the longitudinal axis 210 of the tug and the longitudinal axis 220 of the airplane. Rotation of turret 125 is sensed by rotation sensor 145 which provides a feedback output to controller 119.

Controller 119 preferably performs steering of tug 100 by steering steerable wheels 104, 106, 108 and 110 and rotation of the turret 125 by turret rotation motor 146 in accordance with two feedback control loops. One feedback loop ensures that the heading of the tug 100 follows a predetermined travel path established by the airport command and control system 250. The second feedback loop employs laser range finders 154 to ensure that the nose landing gear wheels 204 are aligned parallel to the longitudinal axis 220 of the airplane. The laser range finders 154 ascertain the angle α between the longitudinal axis 210 of the tug 100 and the longitudinal axis 220 of the airplane 202. Controller 119 ensures that the turret 125 is rotated relative to the longitudinal axis 210 by an angle −α, so as to ensure that the nose landing gear wheels 204 remain aligned with the longitudinal axis 220 of the airplane at all times.

Figure 4C:
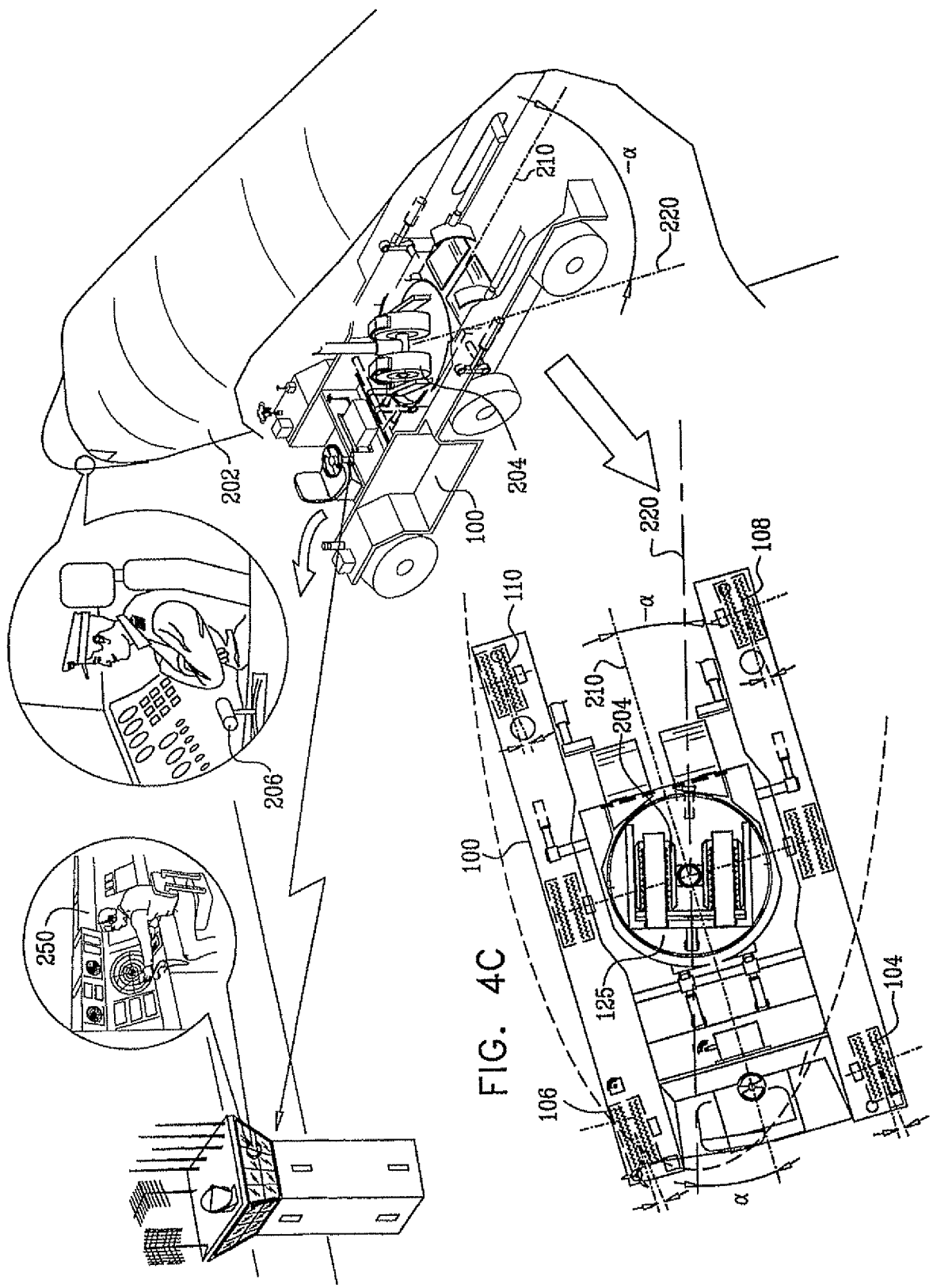

FIG. 4C shows a further stage of rotation of the tug 100 At this stage the angle α between the longitudinal axis 210 of the tug 100 and the longitudinal axis 220 of the airplane 202 and the angle −α between the turret 125 and the longitudinal axis 210 of tug 100 are shown to be twice the angles shown in FIG. 4B.

Figure 4D:
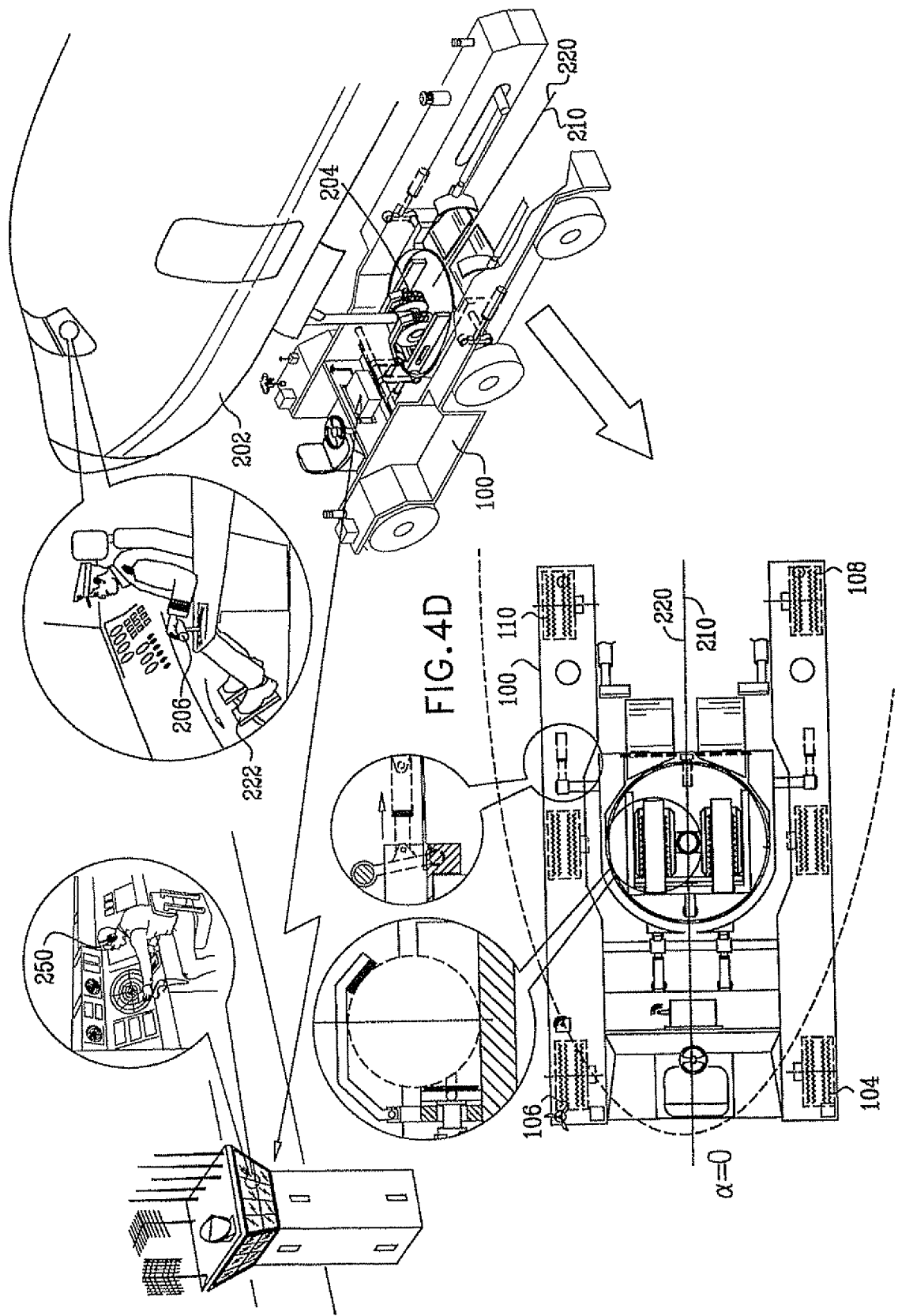

FIG. 4D shows overriding of the autonomous mode of operation by the airplane pilot, preferably by the airplane pilot pressing on braking pedals 222. This overriding may be for emergency braking and/or to enable the airplane pilot to control steering of the tug 100, as described hereinabove with reference to FIGS. 3A-3E. Braking of the airplane 202 is performed by brakes on the main landing gear (not shown) of the airplane 202 and immediately causes the application of a force sensed by the load cells 148 on clamps 147, the output of which is received by controller 119, which immediately decelerates the tug 100.

Controller 119 automatically terminates autonomous mode operation of the tug 100 and returns the tug to airplane pilot control operation, as described above with reference to FIGS. 3A-3E.

Inasmuch as there is a time lag between braking of the airplane 202 and corresponding deceleration of the tug 100, forces are applied to rearward energy absorbing pistons 128 which are immediately sensed by load cells 129. Rearward energy absorbing pistons 128 absorb the energy produced by braking of the airplane 202 relative to the tug 100. At this stage load cells 129 serve as a back up to load cells 148.

A return to autonomous mode operation typically requires an input from the airport command and control system 250 or a pilot command transmitted via an Electronic Flight Book (EFB), commercially available from Astronautics Ltd. of Israel.

Figure 4E:
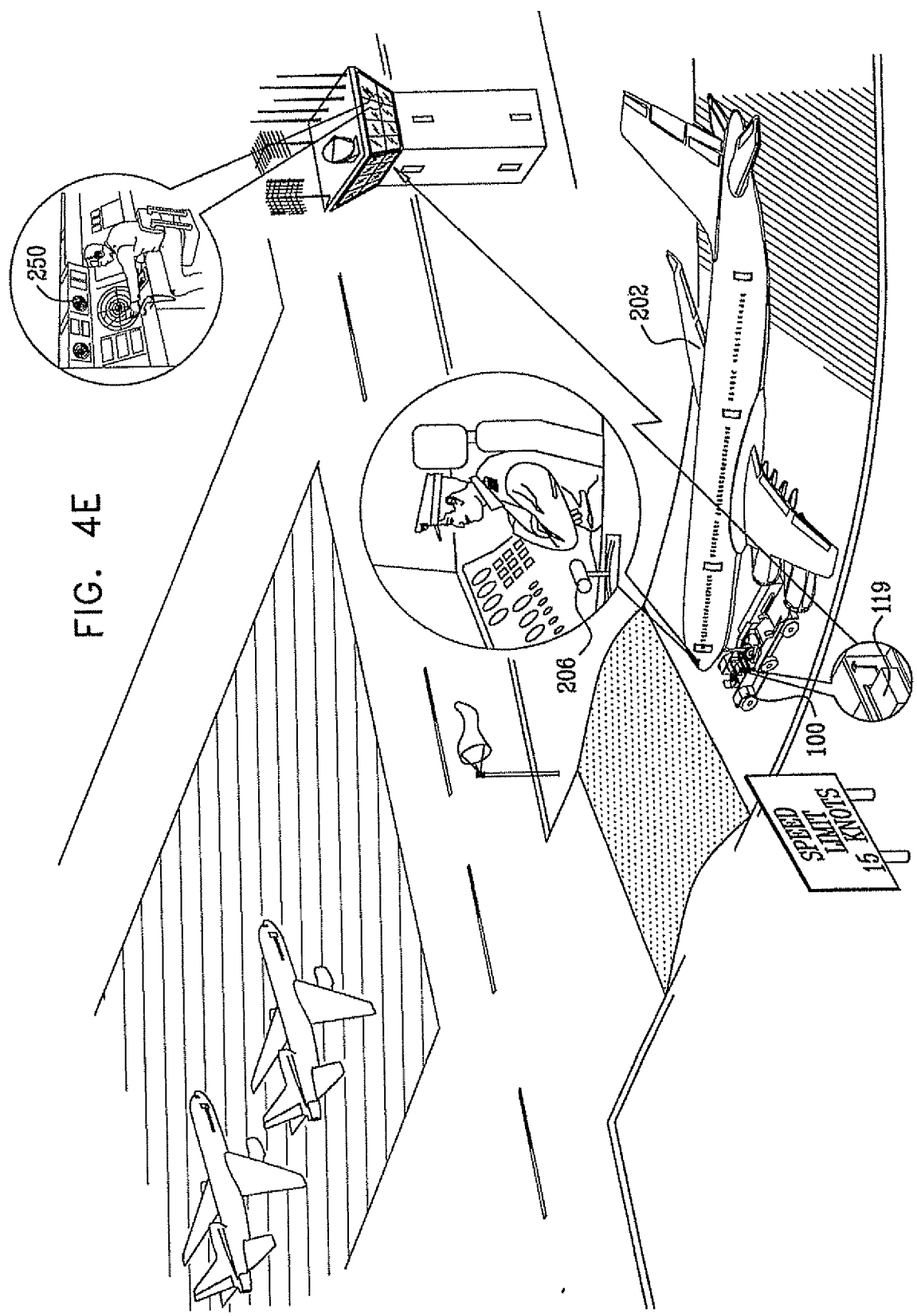

FIG. 4E shows controlled acceleration of the tug 100 in the autonomous mode of operation, governed by controller 119 in response, inter alia, to inputs received from airport command and control center 250 and from force sensors, such as load cells 148 and 129, to provide airplane taxi velocity which is within predetermined speed limits at predetermined locations along an airplane travel path and to ensure that forces applied to the nose landing gear do not exceed predetermined limits, taking into account one or more, and preferably all, of the following factors:

force induced by known slopes at various locations along an airplane travel surface traversed by the tug 100, the locations being identified to the controller 119 by location sensing functionality, such as GPS functionality, here provided by a tug mounted tug location sensor 121 (FIGS. 1A-1C);

wind forces applied to the airplane 202, information regarding the wind forces being supplied to the controller 119 from airport or tug-mounted wind sensors, such as tug mounted wind sensor 122 and preferably also via airport command and control functionality; and tug and airplane rolling friction forces at various locations along the airplane travel surface traversed by the tug 100, the locations being identified to the controller 119 by the location sensing functionality provided by tug location sensor 121, and preferably also via airport command and control functionality.

FIG. 4E also contemplates controlled deceleration of the tug 100 responsive not only to airplane pilot braking of the airplane 202, but also to detection of an obstacle sensed by an obstacle sensor 123 or one of driving cameras 124 (FIGS. 1A-1C) or to control instructions received from airport command and control center 250. The tug deceleration is governed by controller 119 in response, inter alia, to inputs received from force sensors, such as load cells 148 and 129, to ensure a coordinated deceleration ratio between the airplane and the tug, thereby to limit the forces applied to nose landing gear of the airplane 202 to within predetermined force limits.

In order to distinguish between normal traction forces on the nose landing gear and forces applied by the pilot braking, the controller 119 takes into account one or more, and preferably all, of the factors described above, which are indicated by data from the various sensors, such as sensors 120, 121, 122 and 123.

Controller 119 is operative to govern acceleration and deceleration of tug 100 so as to maintain a desired tug speed preferably by employing a speed control feedback loop. The controller 119 has an embedded map of the airport indicating relevant tug speed limits at various regions of the tug travel path. This speed limit information is coordinated with information indicating instantaneous location of the tug 100, which is preferably provided by tug location sensor 121. The controller 119 preferably includes an inertial navigation system which indicates the instantaneous speed of the tug 100. The feedback loop operates to cause the actual speed to be as close as possible to and not to exceed the speed limit for the instantaneous location of the tug.

Controller 119 is also operative to govern acceleration and deceleration of tug 100 to as to limit the horizontal forces applied to the nose landing gear of the airplane 202 to an acceptable limit, which is currently 6% of the airplane gross weight, preferably by employing a force control feedback loop. Controller 119 receives inputs from load cells 148 and 129, which indicate the sum of the forces applied to the nose landing gear of the airplane, resulting from, inter alia, wind, slopes, rolling friction and acceleration or deceleration of the airplane 202 and/or the tug 100. The force feedback loop is operative to accelerate or decelerate the tug 100 such as to maintain the forces sensed by load cells 148 and 129 sufficiently below the acceptable nose landing gear force limit, so as to leave a margin for unexpected accelerations or decelerations of either the airplane 202 or the tug 100.

It is a particular feature of the present invention when operative in the autonomous taxiing mode of operation illustrated in FIGS. 4A-4E, where the taxi speeds of tug 100 and the towed airplane 202 are typically those of the airplane pilot controlled taxiing mode of operation, that the airplane pilot can override the autonomous system to switch to an airplane pilot-controlled mode of operation by applying the airplane brakes and resuming tug steering by the airplane tiller 206. The airplane pilot may also apply the airplane brakes in emergency situations.

Efficient taxiing operation is provided in the autonomous taxiing mode of operation due to the fact that the ground movements of all airplanes in the airport are managed by the command and control system 250 in an integrated manner, thus avoiding lines of airplanes waiting to take off. As seen in FIG. 4E, the command and control system 250 integrates the movement of all airplanes such that airplanes maintain desired spacing therebetween during taxiing and avoid start and stop movements, insofar as possible.

Reference is now made to FIGS. 5A, 5B, 5C, 5D and 5E, which are respective pictorial illustrations of various stages in the autonomous mode of operation of the towbarless airplane tug 100 of FIGS. 1A-1C under the control of a command and control system in the airport tower, via controller 119 for tug taxiing movement and for return of the tug 100 from the take-off area to a pre-pushback location.

Figure 5B:
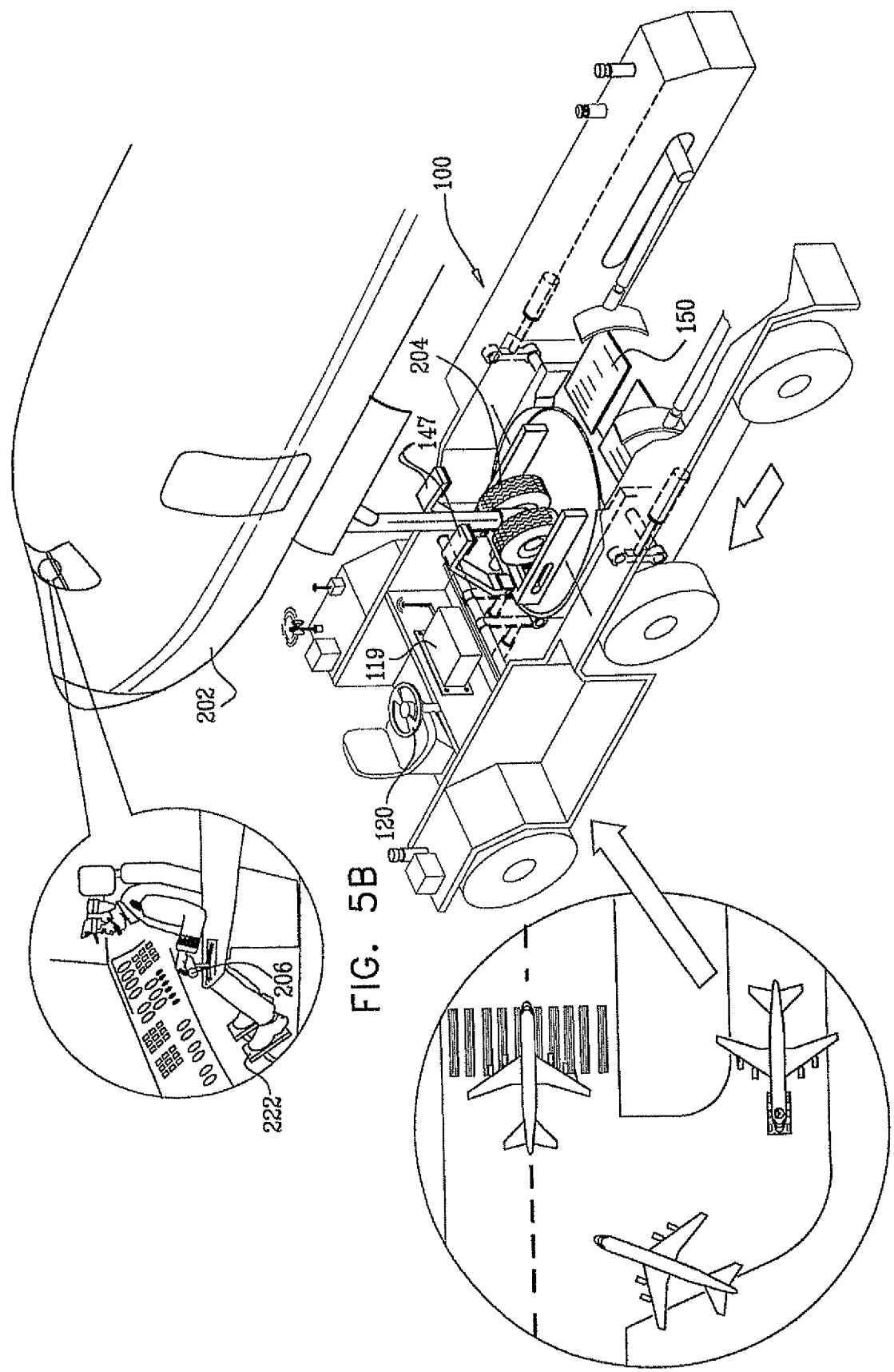
Figure 5C:
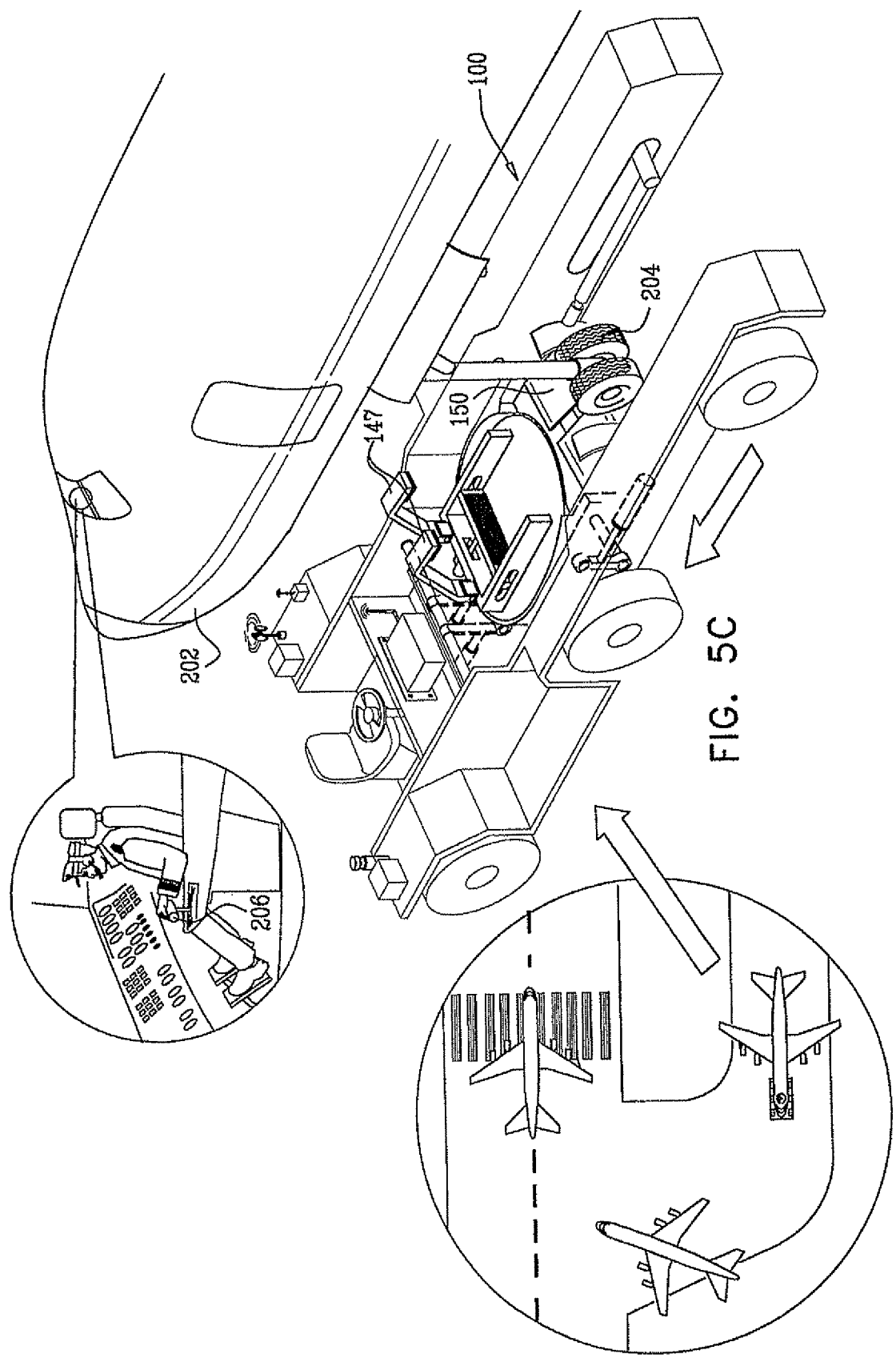

FIGS. 5A, 5B and 5C show disengagement of the tug 100 from the airplane nose landing gear wheels 204. It is appreciated that disengagement of the tug 100 from the airplane is typically carried out after the engines of the airplane have been started by the airplane pilot. In one embodiment of the invention, the command and control system 250 commands the tug 100 to perform disengagement. Alternatively, disengagement by the tug is automatically actuated by the sensed location of the tug at a predetermined disengagement location adjacent the take off point. The disengagement instructions are preferably communicated wirelessly to the controller 119. In response to an instruction to disengage the tug, selectably positionable clamp assembly 147 is disengaged from clamping engagement with the airplane nose landing gear wheels 204 and tug 100 is moved forwardly, while the airplane pilot brakes the airplane 202 and controls the airplane tiller 206, allowing the airplane nose landing gear wheels to roll down the ramp 150 and keeping the nose landing gear parallel to the longitudinal axis of the airplane 220, as the ramp 150 is moved forward relative thereto.

According to an alternative embodiment of the invention, (not illustrated) where a safety driver is present on the tug 100, the disengagement can be carried out by the safety driver in a conventional manner and is usually accompanied by disconnection of a voice communications cord, by the safety driver.

FIG. 5D shows controlled acceleration and steering of the tug governed by controller 119 to provide tug travel speed which is within predetermined speed limits at predetermined locations along a predetermined tug autonomous travel path from the take off area to a pre-pushback location, taking into account one or more, and preferably all, of the following factors:

instantaneous location of the tug 100 as indicated by tug location sensor 121;

obstacle detection information received from sensors 123 or cameras 124;

real time information on the locations of other vehicles along the tug travel path which is provided by the airport command and control system 250; and information indicating one or more predetermined travel paths of the tug 100 from the take-off location to the pre-pushback location. This information may be stored in controller 119 or provided in real time by the airport command and control system 250.

FIG. 5E shows controlled deceleration and parking of the tug governed by controller 119 at a pre-pushback location.

Figure 6B:
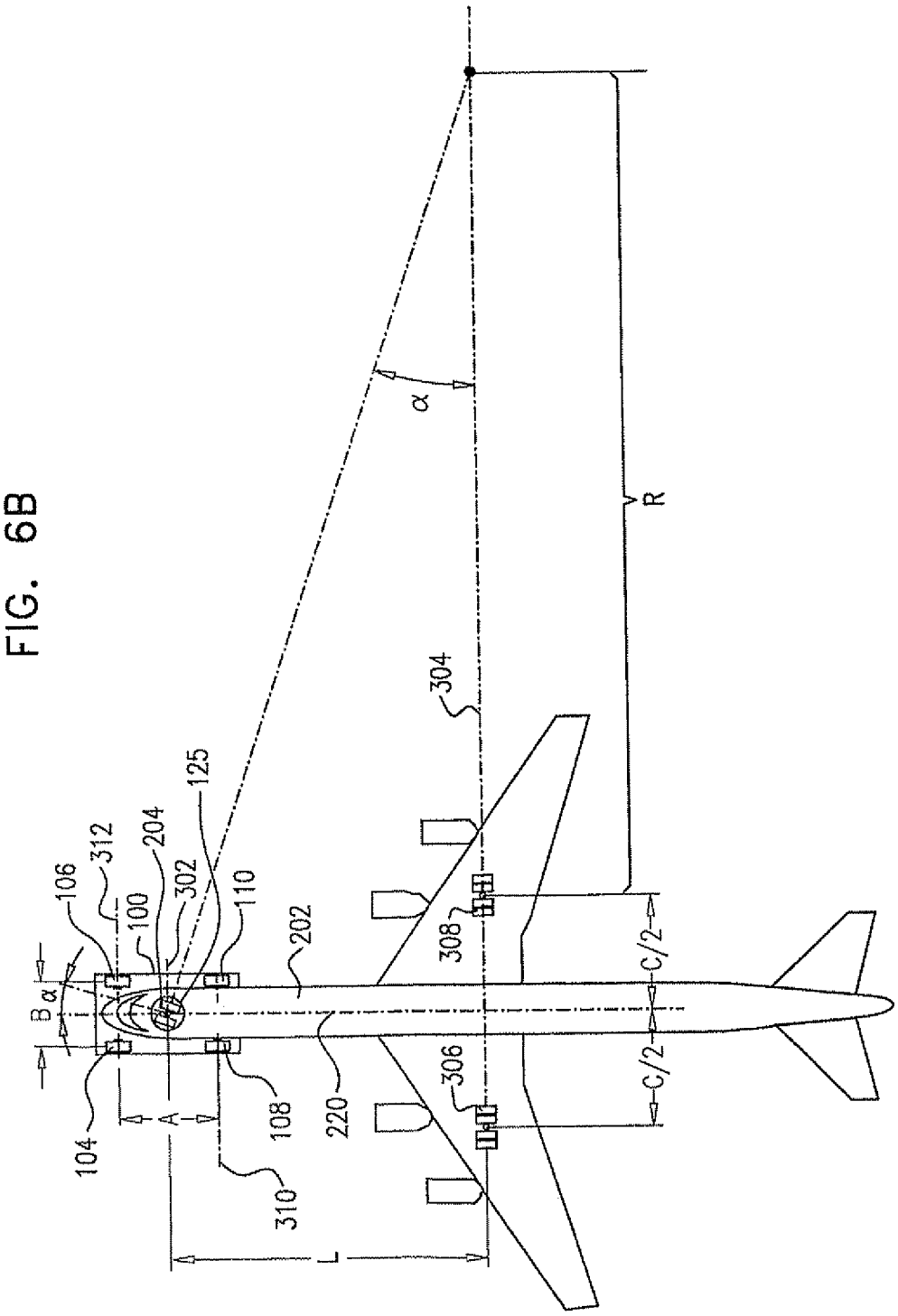
Figure 6C:
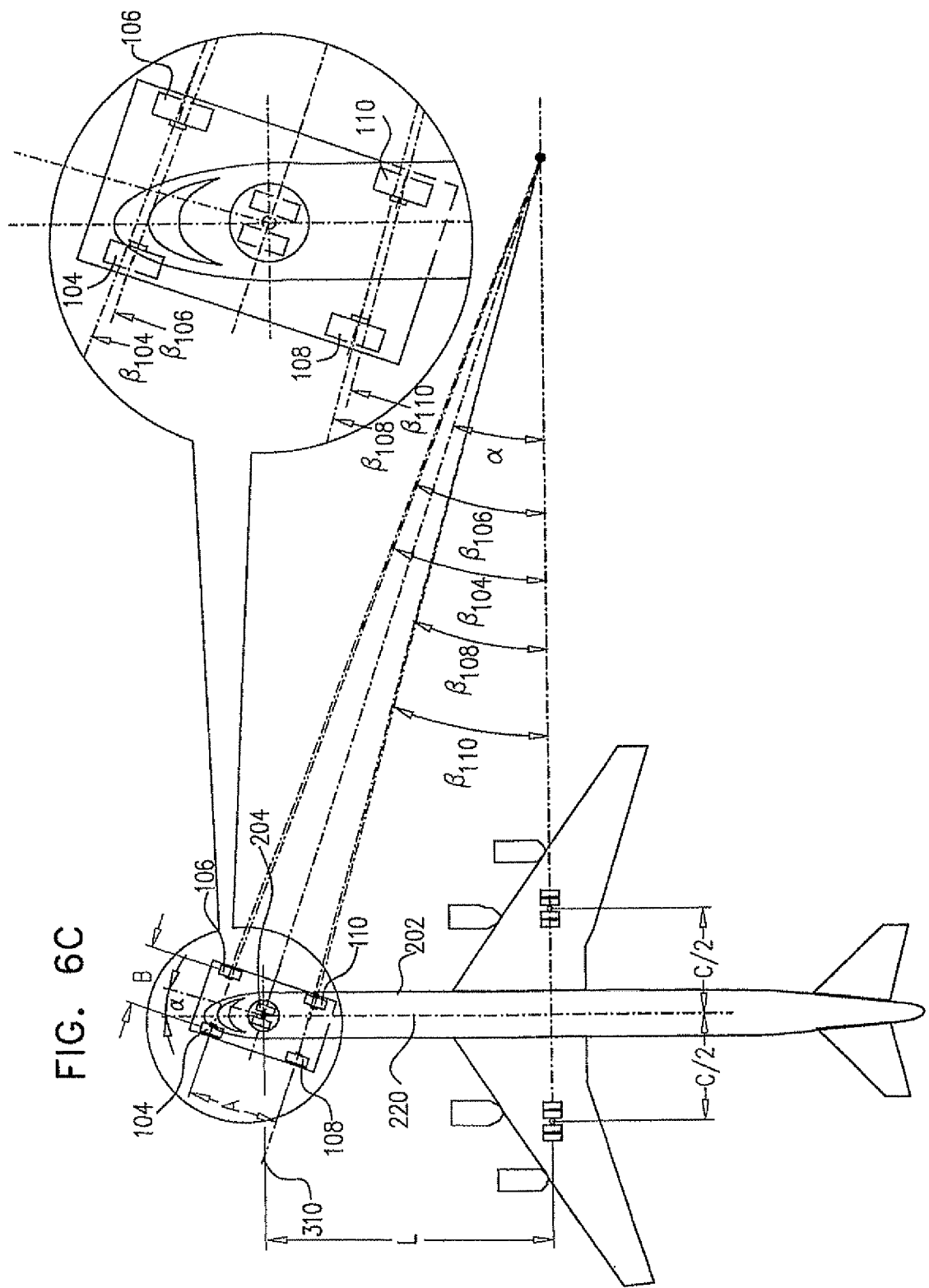

Reference is now made to FIGS. 6A, 6B and 6C, which are respective diagrammatical illustrations of steering functionality of the towbarless airplane tug 100 of FIGS. 1A-1C, which provides Ackerman steering of the airplane 202.

Turning to FIG. 6A, which illustrates the airplane 202 with its nose landing gear wheels 204 steered straight ahead along the longitudinal axis 220 of the airplane 202, the following designations of parameters are noted:

L=Distance along the longitudinal axis 220 of the airplane 202 between the axis of rotation 302 of the nose landing gear wheels 204, and a line 304 joining the main landing gear, here designated by reference numerals 306 and 308;

A=Longitudinal distance between a line 310 connecting the centers of back steerable wheels 108 and 110 and a line 312 connecting the centers of front steerable wheels 104 and 106 of tug 100;

B=Transverse distance between centers of wheels 108 and 110 and between centers of wheels 104 and 106 of tug 100; and C=Distance between main landing gear 306 and 308 along line 304.

FIG. 6B shows airplane 202 with its nose landing gear wheels 204 turned by an angle α, in response to airplane pilot steering using tiller 206 producing corresponding rotation of turret 125 relative to the chassis 102 of tug 100. Controller 119 causes rotation of tug steerable wheels 104, 106, 108 and 110 in order to cause reorientation of the tug 100 such that a goes to zero, as described hereinabove with reference to FIGS. 3A-3E. Controller 119 also controls the motion of the tug 100 such that Ackerman steering of the airplane 202 is produced, as illustrated in FIG. 6B, in accordance with the following parameters:

R+C/2=instantaneous radius of rotation of airplane 202;

α=angle of rotation of the nose landing gear wheels 204 relative to the longitudinal axis 220 of the airplane 202; and $\beta_i$=Steering angle of the wheels of tug 100 (i=104, 106, 108 and 110).

Preferably, the calculation of $\beta_i$ as a function of α is as follows:

$$L/[R+C/2]=\tan \alpha >>>> R=L/\tan \alpha - C/2$$

$$\tan \beta_{108}=[L-A/2 \cos \alpha - B/2 \sin \alpha]/[L/\tan \alpha + A/2 - B/2 \sin \alpha]$$

$$\tan \beta_{110}=[L-A/2 \cos \alpha + (A/2 \tan \alpha + B/2)\sin \alpha]/[L/\tan \alpha + (A/2 \tan \alpha + B/2)\cos \alpha]$$

$$\tan \beta_{104}=[L+A/2 \cos \alpha + B/2 \sin \alpha]/[L/\tan \alpha - A/2 + B/2 \sin \alpha]$$

$$\tan \beta_{106}=[L+A/2 \cos \alpha - (A/2 \tan \alpha + B/2)\sin \alpha]/[L/\tan \alpha - (A/2 \tan \alpha + B/2)\cos \alpha]$$

FIG. 6C illustrates the operation of tug 100 in accordance with a preferred tug steering algorithm whereby the tug 100 is reoriented relative to the airplane 202 such that α is zero. As noted above with reference to FIGS. 3A-3E, controller 119 reorients the tug 100 by rotating steerable tug wheels 104, 106, 108 and 110 as described hereinabove so as to reduce the angle α, sensed by rotation sensor 145, to zero. Controller 119 is preferably operative to cause orientation of the tug 100 such that the instantaneous radius of rotation, R+C/2, of the tug-towed airplane 202 is identical to the instantaneous radius of rotation R+C/2 of the airplane 202, itself, such that in the embodiment of FIGS. 3A-3E, the pilot of the airplane steers the airplane in the same way whether or not it is pulled by the tug 100 or proceeds under its own power.

It will be appreciated by persons skilled in the art that the present invention is not limited by what has been particularly shown and described hereinabove. Rather the invention includes both combinations and subcombinations of various features described hereinabove as well as modifications thereof which would occur to persons skilled in the art upon reading the foregoing description and which are not in the prior art.

The invention claimed is:
1. A towbarless airplane tug comprising:
(a) a chassis mounted on a plurality of tug wheels, at least some of said tug wheels being steerable tug wheels and at least some of said tug wheels being drivable tug wheels;

(b) an airplane wheel support turret assembly, rotatably mounted in connection with said chassis and operative to support at least one wheel of a nose landing gear of an airplane;

(c) at least one rotation sensor connected to said wheel support turret assembly and operative to sense rotation of said wheel support turret assembly relative to said chassis, said rotation resulting at least from steering control induced movement of the nose landing gear caused by pilot-controlled ground steering of said airplane, and to generate an output indicating a direction of said pilot-controlled ground steering of said airplane;

(d) at least one tug wheel driver unit operative to drive said drivable tug wheels;

(e) at least one tug wheel steering mechanism operative to steer said steerable tug wheels thereby providing steering of said chassis; and (f) at least one tug controller operative to control operation of at least said tug wheel steering mechanism at least in response to said output of said rotation sensor, so as to cause steering said steerable tug wheels such that said chassis moves in the direction indicated in said output of said rotation sensor.

2. The towbarless airplane tug of claim 1 further comprising at least one first force sensor operative in engagement with said at least one nose landing gear wheel so as to sense forces applied to said nose landing gear wheel in at least one generally horizontal direction, and further operative to generate output indicating a difference in acceleration or deceleration of said airplane tug relative to acceleration or deceleration of the airplane being towed, said difference caused, at least, by pilot-controlled deceleration of the airplane; and wherein said tug controller is further operative to control, responsive at least to said output of said first force sensor, said tug wheel driver unit so as to maintain the forces applied to said nose landing gear of said airplane within predefined limits.

3. The towbarless airplane tug of claim 1 further comprising a horizontal base assembly supporting said wheel support turret assembly, engaged to said chassis by at least one energy absorber assembly mounted between said horizontal base assembly and said chassis and operative to absorb energy resulting from a difference in acceleration or deceleration of said airplane tug relative to the airplane.

4. The towbarless airplane tug of claim 3 further comprising at least one second force sensor positioned in engagement with said energy absorber assembly so as to sense forces applied to said energy absorber assembly and operative to generate an output indicating a difference in acceleration or deceleration of said airplane tug relative to acceleration or deceleration of the airplane being towed, said difference caused, at least, by pilot-controlled deceleration of the airplane and a tug traction force applied to the tug; and wherein said tug controller is further operative to control, responsive at least to said output of said second force sensor, said tug wheel driver unit so as to maintain forces applied to said nose landing gear of said airplane within predefined limits.

5. The towbarless airplane tug of claim 1 further comprising:

(a) a horizontal base assembly supporting said wheel support turret assembly, engaged to said chassis by at least one energy absorber assembly mounted between said horizontal base assembly and said chassis and operative to absorb energy resulting from a difference in acceleration or deceleration of said airplane tug relative to acceleration or deceleration of the airplane being towed; and (b) at least one second force sensor positioned in engagement with said energy absorber assembly so as to sense forces applied to said energy absorber assembly and operative to generate an output indicating a difference in acceleration or deceleration of said airplane tug relative to the airplane, said difference caused, at least, by pilot-controlled deceleration of the airplane and a tug traction force applied to the tug; and wherein said tug controller is operative to control, responsive at least to said output of said second force sensor, said tug driver unit so as to maintain the forces applied to said nose landing gear of said airplane within predefined limits.

6. The towbarless airplane tug of claim 5 wherein said tug controller is operative to maintain the forces applied to said nose landing gear of said airplane within predefined limits by employing at least one force feedback loop characterized by the following: output generated by at least one of said force sensors and at least one input selected from a group consisting of:

(a) an indication of known slopes at various locations along an airplane travel surface traversed by said tug;

(b) an indication of wind forces applied to said airplane; and (c) an indication of known airplane and tug rolling friction force at various locations along airplane travel surface traversed by said tug.

7. The towbarless airplane tug of claim 1 wherein said tug controller is further operative to control speed of said tug and is adapted to employ at least one speed feedback loop utilizing at least one of the following inputs:

(a) an indication of known desired speed at various locations along an airplane travel surface traversed by said tug, obtained by said tug controller using tug location sensing functionality and a predetermined map of said airplane travel surface indicating speed limits there along;

(b) an indication of known desired speed obtained by said tug controller from an airplane main pilot controller;

(c) a mapping of speed limits along a travel path traversed by said tug and said airplane at an airport according to road and environment conditions;

(d) an indication of an instantaneous location of said tug and said airplane along a travel path; and (e) an indication of obstacles along a travel path traversed by said tug.

8. The towbarless airplane tug of claim 1 further comprising at least one front airplane wheel engagement assembly for placement of said airplane wheels on said airplane wheel support turret assembly such that a vertical axis of rotation of said nose landing gear of said airplane passes through a center of rotation of said airplane wheel support turret assembly relative to said chassis.

9. The towbarless airplane tug of claim 8 wherein said airplane wheel engagement assembly is adaptive to airplane wheel size for placement of said airplane wheels on said airplane wheel support assembly such that a vertical line of rotation of said airplane wheel lies along a vertical axis of rotation of said airplane wheel support turret assembly.

10. The towbarless airplane tug of claim 1 wherein said airplane wheel support turret assembly mounted on a horizontal base assembly which is pivotably connected to said chassis, thereby accommodating tilt of said airplane nose landing gear wheels during airplane movement.

11. The towbarless airplane tug of claim 1 wherein said tug controller is further responsive to commands received from an airport command and control center.

12. The towbarless airplane tug of claim 1 wherein said tug controller is further responsive to preprogrammed driving pathways and speed limits.

13. The towbarless airplane tug of claim 1 wherein said tug controller is operative to control steering of said tug by employing at least one position feedback loop utilizing at least an indication of rotation of said airplane nose landing gear wheels clamped in the airplane wheel support turret assembly, said indication provided by said rotation sensor.

14. A towbarless airplane tug comprising:
 (a) a chassis mounted on a plurality of tug wheels, at least some of said tug wheels being steerable tug wheels and at least some of said tug wheels being drivable tug wheels;
 (b) an airplane wheel support turret assembly, rotatably mounted in connection with said chassis and operative to support at least one wheel of a nose landing gear of an airplane;
 (c) a horizontal base assembly supporting said wheel support turret assembly and engaged to said chassis by at least one energy absorber assembly mounted between said horizontal base assembly and said chassis;
 (d) at least one rotation sensor connected to said wheel support turret assembly and operative to sense rotation of said wheel support turret assembly relative to said chassis, said rotation resulting at least from steering control induced movement of the nose landing gear caused by pilot-controlled ground steering of said airplane, and further operative to generate an output indicating a direction of said pilot-controlled ground steering of said airplane;
 (e) at least one first force sensor operative in engagement with at least one nose landing gear wheel so as to sense forces applied to said nose landing gear wheel in at least one generally horizontal direction, and further operative to generate an output indicating a difference in acceleration or deceleration of said airplane tug relative to acceleration or deceleration of the airplane being towed, said difference caused, at least, by pilot-controlled deceleration of the airplane;
 (f) at least one second force sensor positioned in engagement with said energy absorber assembly so as to sense forces applied to said energy absorber assembly and operative to generate an output indicating a difference in acceleration or deceleration of said airplane tug relative to acceleration or deceleration of the airplane being towed, said difference caused, at least, by pilot-controlled deceleration of the airplane;
 (g) at least one tug controller operative to control operation of said tug in response to at least one output among the outputs generated by said sensors.

15. A towbarless airplane tug comprising:
 (a) a chassis mounted on a plurality of tug wheels, at least some of said tug wheels being steerable tug wheels and at least some of said tug wheels being drivable tug wheels;
 (b) an airplane wheel support turret assembly, rotatably mounted in connection with said chassis and operative to support at least one wheel of a nose landing gear of an airplane;
 (c) a horizontal base assembly supporting said wheel support turret assembly and engaged to said chassis by at least one energy absorber assembly mounted between said horizontal base assembly said chassis;
 (d) at least one tug wheel driver unit operative to drive said drivable tug wheels;
 (e) at least one first force sensor positioned in engagement with said energy absorber assembly so as to sense forces applied to said energy absorber assembly and operative to generate an output indicating a difference in acceleration or deceleration of said airplane tug relative to acceleration or deceleration of the airplane being towed, said difference caused, at least, by pilot-controlled deceleration of the airplane; and
 (f) at least one tug controller operative to control, responsive at least to said output of said first force sensor, said tug wheel driver unit so as to maintain the forces applied to said nose landing gear of said airplane within predefined limits.

16. The towbarless airplane tug of claim 15 further comprising at least one second force sensor operative in engagement with said nose landing gear wheel so as to sense forces applied to said nose landing gear wheel in at least one generally horizontal direction, and further operative to generate an output indicating a difference in acceleration or deceleration of said airplane tug relative to acceleration or deceleration of the airplane being towed, said difference caused, at least, by pilot-controlled deceleration of the airplane; wherein said tug controller is operative to control said tug wheel driver unit so as to maintain the forces applied to said nose landing gear of said airplane within predefined limits responsive at least to one output among said outputs of said first force sensor and said second force sensor.

17. The towbarless airplane tug of claim 16 wherein said tug controller is operative to maintain the forces applied to said nose landing gear of said airplane within predefined limits by employing at least one force feedback loop characterized by the following: said output generated by at least one of said first and second force sensors and at least one input selected from a group consisting of:
 (a) an indication of known slopes at various locations along an airplane travel surface traversed by said tug;
 (b) an indication of wind forces applied to said airplane; and
 (c) an indication of known airplane and tug rolling friction force at various locations along airplane travel surface traversed by said tug.

18. The towbarless airplane tug of claim 15 wherein said predefined limits is sufficiently below an acceptable nose landing gear forte limit, so as to leave a margin for unexpected accelerations or decelerations of either the airplane or the airplane tug.

19. A towbarless airplane tug comprising:
 (a) a chassis mounted on a plurality of tug wheels, at least some of said tug wheels being steerable tug wheels and at least some of said tug wheels being drivable tug wheels;
 (b) an airplane wheel support turret assembly, rotatably mounted in connection with said chassis and operative to support at least one wheel of a nose landing gear of an airplane;
 (c) at least one tug wheel driver unit operative to drive said drivable tug wheels thereby providing a tug traction force;
 (d) at least one first force sensor operative in engagement with said nose landing gear wheel so as to sense forces applied to said nose landing gear wheel in at least one generally horizontal direction, and further operative to generate an output indicating a difference in acceleration or deceleration of said airplane tug relative to the airplane, said difference caused, at least, by pilot-controlled deceleration of the airplane; and (e) at least one tug controller operative to control, responsive at least to said output of said first force sensor, said tug wheel driver unit so as to maintain the forces applied to said nose landing gear of said airplane within predefined limits.

20. A method of operating a towbarless airplane tug comprising a chassis mounted on a plurality of tug wheels, an airplane wheel support turret assembly mounted in connection with said chassis and operative to support at least one wheel of a nose landing gear of an airplane, at least one tug wheel driver unit operative to drive drivable tug wheels among said plurality of tug wheels, and at least one tug wheel steering mechanism operative to steer steerable tug wheels among said plurality of tug wheels, the method comprising:

(a) sensing rotation of said airplane wheel support turret assembly relative to said chassis with the help of at least one rotation sensor connected to said wheel support turret assembly, said rotation is resulted at least from steering control induced movement of nose landing gear caused by pilot-controlled ground steering of said airplane;

(b) generating an output of said rotation sensor indicative of direction of pilot-controlled ground steering of said airplane;

(c) controlling, responsive at least to said generated output of said rotation sensor, said tug wheel steering mechanism so as to cause steering said tug wheels such that said chassis moves in the direction indicated in said output of said rotation sensor.

21. The method of claim 20 further comprising:

(a) sensing, with the help of at least one first force sensor positioned in engagement with said nose landing gear wheel, forces applied to said nose landing gear wheel in at least one generally horizontal direction;

(b) generating an output of said first force sensor indicative of a difference in acceleration or deceleration of said airplane tug relative to acceleration or deceleration of the airplane being towed, said difference caused, at least, by pilot-controlled deceleration of the airplane; and (c) controlling, responsive at least to said generated output of said first force sensor, said tug wheel driver unit so as to maintain the forces applied to said nose landing gear of said airplane within predefined limits.

22. The method of claim 20 wherein the towbarless airplane tug further comprises a horizontal base assembly supporting said wheel support turret assembly and engaged to said chassis by at least one energy absorber assembly mounted between said horizontal base assembly and said chassis, the method further comprising:

(a) sensing force applied to said energy absorber assembly, said sensing provided with the help of at least one second force sensor positioned in engagement with said energy absorber assembly;

(b) generating an output of said second force sensor indicating a difference in acceleration or deceleration of said airplane tug relative to acceleration or deceleration of the airplane being towed, said difference caused, at least, by pilot-controlled deceleration of the airplane;

(c) controlling, responsive at least to said output of said second force sensor, said tug wheel driver unit so as to maintain the forces applied to said nose landing gear of said airplane within predefined limits.

23. A method of operating a towbarless airplane tug comprising a chassis mounted on a plurality of tug wheels, an airplane wheel support turret assembly mounted in connection with said chassis and operative to support at least one wheel of a nose landing gear of an airplane, and at least one tug wheel driver unit operative to drive drivable tug wheels among said plurality of tug wheels, the method comprising:

(a) sensing, with the help of at least one first force sensor positioned in engagement with said nose landing gear wheel, forces applied to said nose landing gear wheel in at least one generally horizontal direction;

(b) generating an output of said first force sensor indicative of a difference in acceleration or deceleration of said airplane tug relative to acceleration or deceleration of the airplane being towed, said difference caused, at least, by pilot-controlled deceleration of the airplane; and (c) controlling, responsive at least to said generated output of said first force sensor, said tug driver unit so as to maintain the forces applied to said nose landing gear of said airplane within predefined limits.

24. The method of claim 23 wherein the towbarless airplane tug further comprises a horizontal base assembly supporting said wheel support turret assembly and engaged to said chassis by at least one energy absorber assembly mounted between said horizontal base assembly and said chassis, the method further comprising:

(a) sensing forces applied to said energy, absorber assembly, said sensing provided with the help of at least one second force sensor positioned in engagement with said energy absorber assembly;

(b) generating an output of said second force sensor indicating a difference in acceleration or deceleration of said airplane tug relative to acceleration or deceleration of the airplane being towed, said difference caused, at least, by pilot-controlled deceleration of the airplane; and (c) controlling said tug wheel driver unit responsive at least to one output among said outputs of said first force sensor and said second force sensor so as to maintain the forces applied to said nose landing gear of said airplane within predefined limits.

25. The method of claim 24 wherein said predefined limits are sufficiently below an acceptable nose landing gear force limit, so as to leave a margin for unexpected accelerations or decelerations of either the airplane or the airplane tug.

26. The method of claim 23 further comprising:

(a) sensing rotation of said airplane wheel support turret assembly relative to said chassis with the help of at least one rotation sensor connected to said wheel support turret assembly, said rotation is resulted at least from steering control induced movement of nose landing gear caused by pilot-controlled ground steering of said airplane;

(b) generating an output of said rotation sensor indicative of direction of pilot-controlled ground steering of said airplane;

(c) controlling, responsive at least to said generated output of said rotation sensor, said tug wheel steering mechanism so as to cause steering said tug wheels such that said chassis moves in the direction indicated in said output of said rotation sensor.

27. A method of operating a towbarless airplane tug comprising a chassis mounted on a plurality of tug wheels, an airplane wheel support turret assembly mounted in connection with said chassis and operative to support at least one wheel of a nose landing gear of an airplane, a horizontal base assembly supporting said wheel support turret assembly and engaged to said chassis by at least one energy absorber assembly mounted between said horizontal base assembly and said chassis, at least one tug wheel driver unit operative to drive drivable tug wheels among said plurality of tug wheels, and at least one tug wheel steering mechanism operative to steer steerable tug wheels among said plurality of tug wheels, the method comprising:

(a) sensing rotation of said wheel support turret assembly relative to said chassis with the help of at least one rotation sensor connected to said wheel support turret assembly, said rotation resulting at least from steering control induced movement of the nose landing gear caused by pilot-controlled ground steering of said airplane, and generating an output of said rotation sensor indicating a direction of said pilot-controlled ground steering of said airplane;

(b) sensing forces applied to said nose landing gear wheel in at least one generally horizontal direction with the help of at least one first force sensor operative in engagement with said nose landing gear wheel, and generating an output of said first force sensor indicating a difference in acceleration or deceleration of said airplane tug relative to acceleration or deceleration of the airplane being towed, said difference caused, at least, by pilot-controlled deceleration of the airplane;

(c) sense forces applied to said energy absorber assembly with the help of at least one second force sensor positioned in engagement with said energy absorber assembly, and generating an output of said second force sensor indicating a difference in acceleration or deceleration of said airplane tug relative to acceleration or deceleration of the airplane being towed, said difference caused, at least, by pilot-controlled deceleration of the airplane;

(d) controlling operation of said tug with the help of at least one tug controller operative to control said tug in response to at least one output among the outputs generated by said sensors.

* * * * *